(12) United States Patent
Hashima et al.

(10) Patent No.: US 7,383,162 B2
(45) Date of Patent: Jun. 3, 2008

(54) HARNESS DESIGN SUPPORTING APPARATUS AND COMPUTER-READABLE RECORDING MEDIUM RECORDING HARNESS DESIGN SUPPORTING PROGRAM

(75) Inventors: Masayoshi Hashima, Kawasaki (JP); Yuichi Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 416 days.

(21) Appl. No.: 11/151,456

(22) Filed: Jun. 14, 2005

(65) Prior Publication Data

US 2005/0240383 A1 Oct. 27, 2005

Related U.S. Application Data

(63) Continuation of application No. PCT/JP03/06214, filed on May 19, 2003.

(51) Int. Cl.
*G06F 17/50* (2006.01)
*G06F 17/10* (2006.01)

(52) U.S. Cl. ............... 703/2; 703/22; 703/27; 702/85; 702/150; 702/155

(58) Field of Classification Search .............. 703/2, 703/7, 22, 27; 702/150, 155, 85
See application file for complete search history.

(56) References Cited

U.S. PATENT DOCUMENTS

2001/0020223 A1* 9/2001 Kodama et al. ............... 703/2

FOREIGN PATENT DOCUMENTS

JP 2001-250438 9/2001
JP 2002-73701 3/2002

OTHER PUBLICATIONS

H. Wakamatsu et al., "Modeling of Linear Objects Considering Bend, Twist, and Extensional Deformations", IEEE Int. Conf. on Robtics and Automation, 1995.
S. Hirai et al., "A Static Analysis of Hysteresis in Deformation of Twistable String Objects", Proceedings of the 15th Annual Conference of the Robotics Society of Japan, pp. 289-290, 1997.

(Continued)

*Primary Examiner*—Thai Phan
(74) *Attorney, Agent, or Firm*—Westerman, Hattori, Daniels & Adrian, LLP.

(57) ABSTRACT

The present invention relates to an apparatus for carrying out a harness design in a short time while taking a physical characteristic of a harness at the design and development of equipment incorporating the harness. The apparatus comprises a component information preserving unit for preserving three-dimensional model data on a component other than the harness in an apparatus which is an object of design, a harness information setting unit for setting information on the harness as harness information, a characteristic information setting unit, a three-dimensional model constructing unit for constructing a three-dimensional model of each of the harness and the component on the basis of the harness information set in the harness information setting unit, the three-dimensional model data on the component in the component information preserving unit and the characteristic information set in the characteristic information setting unit, and a display control unit.

26 Claims, 20 Drawing Sheets

OTHER PUBLICATIONS

Zuken "Cabling Designer", http://www.zuken.ugs.com/eda/whd-cabling-designer.asp, no date.

Eds "I-Deas Harness Design", http://www.ugs.com/products/nx/docs/fs-ideas-harness.pdf, no date.

R. Nakayama, "VPS V10L 15 which Facilitates the Reflection of a Change of Design" Nikkei Digital Engineering, No. 60, p. 46, Nov. 15, 2002.

* cited by examiner

SPECIFIED PARAMETER
- BENDING RIGIDITY :Rf[N·mm2]
- TORSIONAL RIGIDITY :Rt[N·mm2]
- LINEAR DENSITY :A [Kg/mm]
- LENGTH :L[mm]
- STARTING POINT ·
- END POINT POSITION

POTENTIAL ENERGY :U $$U = \int_0^L \frac{Rf}{2} K^2 ds + \int_0^L \frac{Rt}{2} \omega^2 ds + \int_0^L Agz ds$$
(BENDING)      (TORSION)         (GRAVITY)

CALCULATE A CURVE WHICH MINIMIZES U

D1

D2

D3

D5

D7

HARNESS DESIGN SUPPORTING APPARATUS AND COMPUTER-READABLE RECORDING MEDIUM RECORDING HARNESS DESIGN SUPPORTING PROGRAM

This application is a continuation of international application PCT/JP2003/006214 filed on May 19, 2003.

FIELD OF THE INVENTION

The present invention relates to a technique of, for the design and development of equipment (for example, printer, vehicle, machine tool, industrial robot, and others) incorporating a harness, supporting harness design for the purpose of enhancing the efficiency of the harness design such as design on harness mounting position or design on harness production. In the present invention, the "harness" includes not only wiring, cable, wire and others to be incorporated into an apparatus, but also piping, rubber hose or the like, and even band members and wire members having flexibility or elasticity, and the members in a state bundled up. The present invention is applicable to the arrangement design of these members.

DESCRIPTION OF THE RELATED ART

In general, in the case of the design of an apparatus such as printer, vehicle, machine tool or industrial robot incorporating a harness, the design of the harness to be interposed between parts constituting the apparatus is made after the designs of both a mechanical system and an electrical system organizing the apparatus reach completion in some degree, then determining the harness mounting position and arrangement position.

This is because, in a case in which a harness is built in an apparatus, there is a need to design the route of the harness, the positions of connectors and fasteners, the length of the harness and others and, if the designs of both the mechanical system and the electrical system do not reach completion in some degree, difficulty is experienced in determining the types and dispositions of wiring. For this reason, the harness design has frequently been postponed so far.

However, in fact, so far, after the completion of a prototype model, the length of an actual harness has usually been adjusted in a state incorporated into the prototype model. For this reason, there has been a possibility that the detection of a trouble on the harness delays.

Accordingly, in the recent years, there has been employed a system using a three-dimensional model designed by a three-dimensional CAD (Computer Aided Design) so that the design on the arrangement of a harness is made on this three-dimensional model so as to detect as many troubles of the harness as possible in the designing process. For example, the typical systems are as follows.

(1) "EMbassy": Linius Co., Ltd., <URL: http://www.linius.com/products/>

(2) "Cabling Designer": Zuken Co., Ltd., <URL: http://www.zuken.co.jp/sd/cabling/cabling.htm>

(3) "I-DEAS Harness Design": EDS Co., Ltd, <URL: http://www.sdrc.com/ideas/appl-prod/harness.html>

These systems are made to design a three-dimensional model of a harness on a three-dimensional CAD or through the use of CAD data.

Meanwhile, if the harness design is made without taking physical characteristics of the harness such as rigidity into consideration, there is a possibility of creating a harness route with low feasibility, such as a route where by a physically unnatural force is applied to the harness.

In the above-mentioned conventional systems, the calculations are made through the use of a finite-element method or the like for analyzing the route thereof while taking the physical characteristics of the harness such as rigidity into consideration. However, the analysis using the finite-element method or the like takes time, which can suffer the delay of the harness design, and if a designer, who has a dislike of such delay, designs it without reflecting the rigidity of the harness, there is a possibility that the degradation of the design quality occurs.

In addition, the minimum radius of curvature of the harness is determined as a specification based upon the physical characteristics, and there is a need to design the harness route so that a bent portion of the harness exceeds this minimum radius of curvature. Therefore, in the harness design, it is also expected to take a measure for preventing the occurrence of a portion falling below the minimum radius of curvature in the harness route.

The present invention has been developed in consideration of these problems, and it is an object of the invention to achieve the harness design taking the physical characteristics of the harness in a short time.

Non-Patent Document 1
(1) "EMbassy": Linius Co., Ltd., <URL: http://www.linius.com/products/>
Non-Patent Document 2
(2) "Cabling Designer": Zuken Co., Ltd., <URL: http://www.zuken.co.jp/sd/cabling/cabling.htm>
Non-Patent Document 3
(3) "I-DEAS Harness Design": EDS Co., Ltd, <URL: http://www.sdrc.com/ideas/appl-prod/harness.html>

SUMMARY OF THE INVENTION

For this purpose, a harness design supporting apparatus according to the present invention, made to support an arrangement design of a harness in an apparatus incorporating the harness which is an object of design, comprises a component information preserving unit for preserving three-dimensional model data on a component other than the harness in the design object apparatus, a harness information setting unit for setting information on the harness as harness information, a characteristic information setting unit for setting information on a physical characteristic of the harness as characteristic information, a three-dimensional model constructing unit for constructing a three-dimensional model of each of the harness and the component on the basis of the harness information set in the harness information setting unit, the three-dimensional model data on the component in the component information preserving unit and the characteristic information set in the characteristic information setting unit, and a display control unit for displaying the three-dimensional model, constructed in the three-dimensional model constructing unit, on a display unit.

In addition, a harness design supporting program according to the present invention, made to support an arrangement design of a harness in an apparatus incorporating the harness which is an object of design, makes a computer realize a function as a harness information setting unit for setting information on the harness as harness information, a characteristic information setting unit for setting information on a physical characteristic of the harness as characteristic information, a three-dimensional model constructing unit for constructing a three-dimensional model of each of the harness and a component on the basis of the harness information set in the harness information setting unit, three-dimensional model data on a component other than the harness in an apparatus which is an object of design, preserved in a component information preserving unit, and the characteristic information set in the characteristic information setting unit, and a display control unit for displaying the three-dimensional model, constructed in the three-dimensional model constructing unit, on a display unit. Still additionally, a computer-readable recording medium according to the present invention records the above-mentioned harness design supporting program.

The foregoing harness design supporting apparatus, harness design supporting program and computer-readable recording medium recording the same program can provide the following effects and advantages.

(1) Information on a physical characteristic (for example, rigidity) of a harness is set as characteristic information in the characteristic information setting unit and a three-dimensional model on each of the harness and a component is constructed on the basis of the harness information set in the harness information setting unit, three-dimensional model data on a component and the characteristic information set in the characteristic information setting unit. This enables a harness route to be designed so as to commensurate with the physical characteristic (for example, rigidity) of the harness, which improves the harness design quality and realizes the enhancement of efficiency of the harness design.

(2) A mode selecting unit selects one of a first calculation mode of calculating a position of the harness and a configuration thereof through the approximation using the Bezier curve on the basis of one or more transit positions of the harness and information on a posture at the transit position, included in the harness information, and the characteristic information set in the characteristic information setting unit and a second calculation mode of calculating a position of the harness and a configuration thereof through the approximation using the Bezier curve on the basis of one or more transit positions of the harness and information on a posture at the transit position, included in the harness information and a harness position/configuration calculating unit calculates the harness position and configuration according to the calculation mode selected by the mode selecting unit. This enables an operator to select a desired calculation mode according to the performance of a computer or the like, which provides high convenience.

(3) In a case in which a verification is made that the component and the harness interfere with each other, a transit position setting unit sets the transit position so that the harness is positioned in parallel with a surface of the component at a position of the interference. This can easily eliminate the interference occurring between the harness and the component, which improves the harness design quality and provides high convenience.

(4) In a case in which a verification is made that the component and the harness interfere with each other, the display control unit makes the display unit display information indicative of the interference position. This enables an operator (designer) to easily find the interference occurring between the harness and the component. Thus, for example, the operator can correct the harness route so that the interference does not occur, which prevents the occurrence of the interference, improves the harness design quality and provides high convenience.

(5) A transit position changing unit can change the transit position of the harness and the posture information thereon and the harness position/configuration calculating unit calculates the harness position and configuration on the basis of the changed harness transit position and the changed posture information. This provides high convenience.

(6) The harness position/configuration calculating unit calculates the harness position and configuration by proportionally distributing the difference between the sum total of the shortest distances between the transit positions on a passage route of the harness and the overall length of the harness among the respective transit positions on the basis of the harness transit position and the posture information changed by the transit position changing unit and the harness transit position and the posture information included in the harness information. Therefore, even in the case of moving/changing an intermediate transit point in a state where the overall length of the harness is fixed, it is possible to shorten the time required for the design of the harness route.

(7) The harness position/configuration calculating unit calculates the harness position and configuration immediately after the transit position and the posture information are changed by the transit position changing unit. Therefore, in a case in which, at the design of the harness route, the position of a transit point is changed when a harness route which is free from a problem in curvature and interference is determined while making fine adjustment on the position of the harness transit point, an operator can immediately confirm the harness route reflecting the change, which provides high convenience.

(8) After the transit positions of a plurality of harnesses and posture information are changed by the transit position changing unit, the harness position/configuration calculating unit calculates the harness position and configuration on the basis of the transit positions of the plurality of harnesses and the posture information after changed by the transit position changing unit. Thus, for example, even in a case in which a computer system does not have a high performance, after an operator changes (moves) the positions of a plurality of transit points, the harness position/configuration calculating unit collectively calculates a harness route with respect to the plurality of moved transit points, which enables the interactive adjustment of the harness route.

(9) In a case in which the harness transit position and the posture information are changed by the transit position changing unit, the harness position/configuration calculating unit calculates the harness position and configuration through the use of information on the harness position and configuration before changed. This enables a convergence calculation to be done in a short time for obtaining a route whereby the potential energy U of the harness reaches a minimum, which leads to the shortening of the design time and to high convenience.

(10) A curvature calculating unit calculates a curvature of the harness and the display control unit displays the information on the curvature of the harness on a display unit. This enables the operator (designer) to easily find the information on the curvature, which provides high convenience.

For example, when the information indicative of the position at which the curvature of the harness reaches a maximum is displayed on the display unit, the operator can easily know the position at which the curvature of the harness stands at a maximum value, which leads to high convenience.

(11) Moreover, in a case in which the value of the curvature of the harness exceeds a predetermined value, the information indicative of this fact is displayed on the display unit. Thus, the operator can find the position at which the curvature of the harness exceeds the predetermined value, which leads to high convenience.

DESCRIPTION OF THE PREFERRED EMBODIMENTS

Embodiments of the present invention will be described hereinbelow with reference to the drawings.

Figure 1:
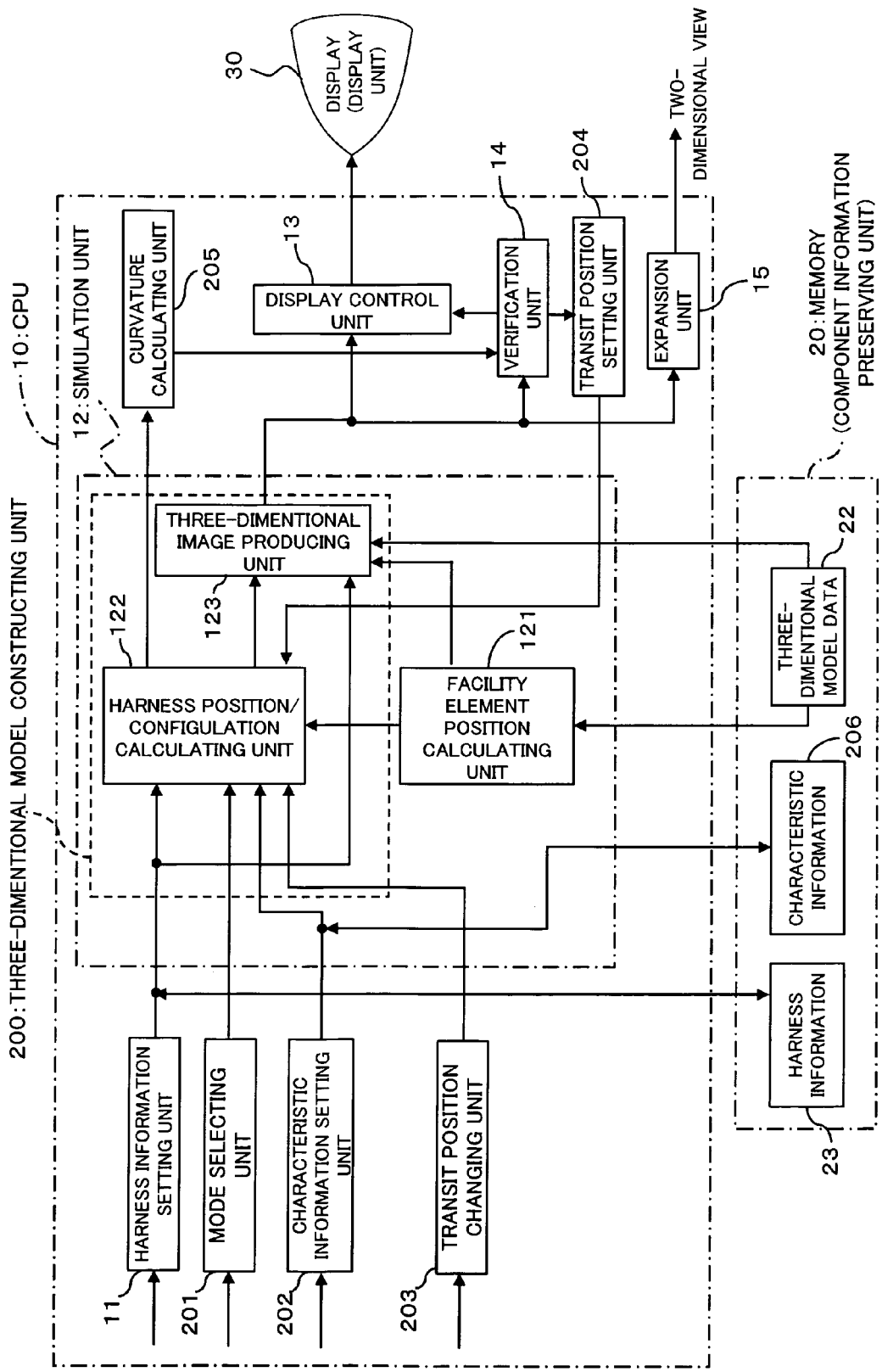
FIG. 1 is a block diagram showing a functional configuration of a harness design supporting apparatus according to an embodiment of the present invention.
Figure 2:
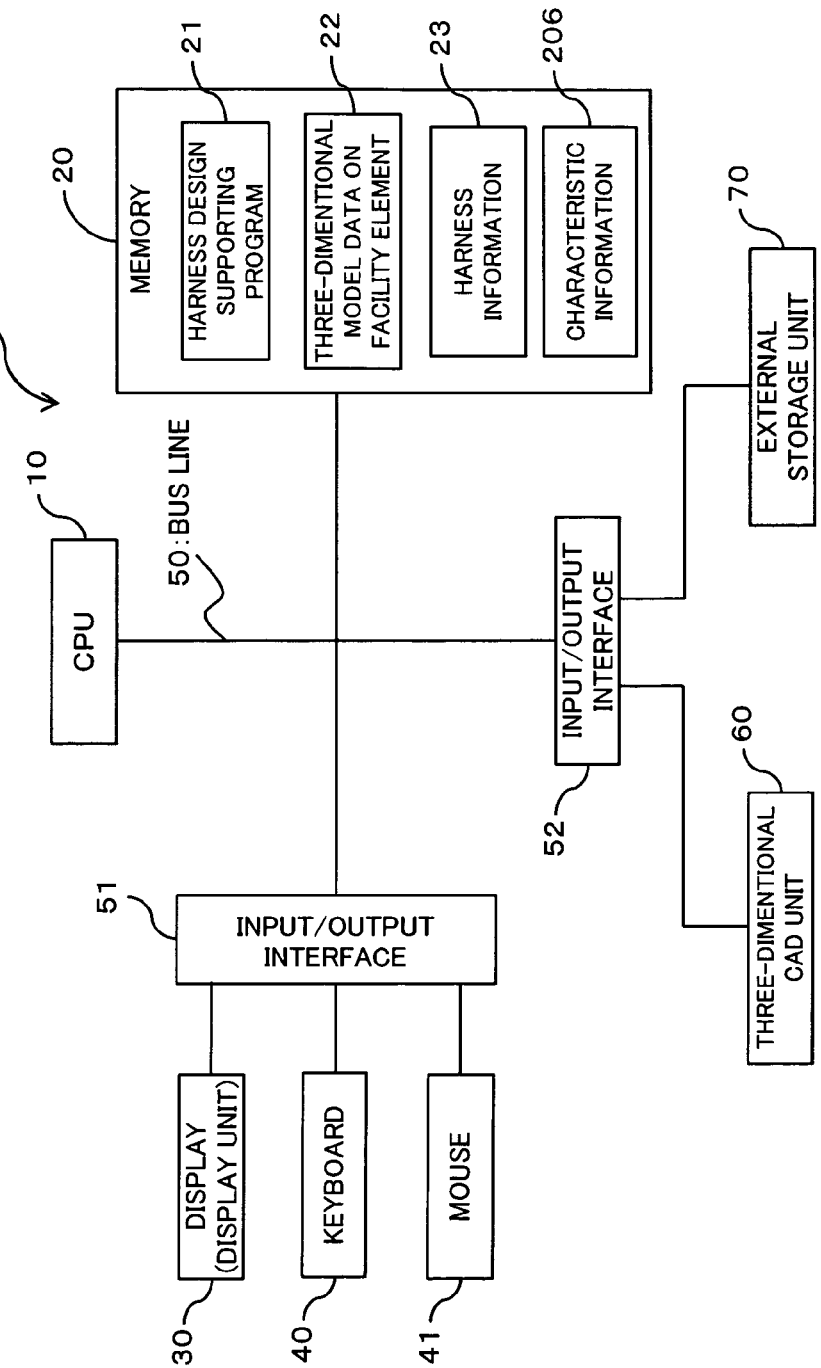
FIG. 2 is a block diagram showing a hardware configuration of a computer system for realizing the harness design supporting apparatus shown in FIG. 1.

[1] About Configuration of Harness Design Supporting Apparatus According to Embodiment FIG. 1 is a block diagram showing a functional configuration of a harness design supporting apparatus according to an embodiment of the present invention, and FIG. 2 is a block diagram showing a hardware configuration of a computer system for realizing the harness design supporting apparatus shown in FIG. 1.

A computer system (for example, personal computer) 1 according to this embodiment, shown in FIGS. 1 and 2, functions as an apparatus to support a harness arrangement design in equipment (for example, printer, vehicle, machine tool, industrial robot, and others) incorporating a harness, which is an object of design.

In this case, for example, the "harness" includes, in addition to wiring, cable, wire and others for signal/power supply, piping, rubber hose or the like, and further includes band members and wire members having flexibility or elasticity and the members in a state bundled up. Both end portions of the harness connected/fixed to connector parts serving as facility elements of the design object equipment.

Moreover, the portions other than both the end portions of the harness can be positioned/fixed by clamp parts, or they can be held in a state loosely inserted into a holding device attached to a predetermined position (transit position) so that the harness is held at the transit position to be movable in longitudinal directions.

As FIG. 2 shows, the computer system 1 is equipped with a CPU 10 and a bus line 50 connected to the CPU 10. To the bus line 50, there are connected a memory (ROM, RAM or the like) 20 and, through an input/output interface 51, further connected a display (for example, CRT, LCD, PDP or the like) 30, a keyboard 40 and a mouse 41. Moreover, to the bus line 50, through an input/output interface 52, there are connected a three-dimensional CAD (Computer Aided Design) unit 60 and an external storage unit 70.

In this case, the memory 20 (or the external storage unit 70) stores an application program (harness design supporting program) 21 which will be described later. In addition, the memory 20 also functions as a working memory when the CPU 10 carries out the application program 21, and the memory 20 stores three-dimensional data (polygon data) 22, harness information 23, information (characteristic information) 206 on a physical characteristic of a harness, and other information, related to facility elements.

The displaying state of the display (display unit) 30 is controlled by the CPU 10 (function as a display control unit 14 which will be mentioned later), and the display 30 indicates a three-dimensional model constructed by the CPU 10 (function as a three-dimensional model constructing unit 200 which will be mentioned later) and indicates a simulation result, obtained by the CPU 10 (function as a simulation unit 12 which will be mentioned later), as a harness operation and a facility element operation.

Moreover, the keyboard 40 and the mouse (pointing device) 41 is manipulated by an operator (user) in a state where a screen is put on the display 30, thereby inputting various types of instructions and information to the CPU 10 (computer system 1). In this embodiment, they are used for inputting the harness information 23 and the characteristic information 206 and controlling the configuration (or shape) of a harness displayed on a screen of the display 30 and further changing a harness transit position (details will be mentioned later) and setting a calculation mode (details will be mentioned later).

In this case, the harness information 23 includes a harness transit position (starting position, intermediate transit position, end position) and a posture (vector information; posture information) at each position and further includes a harness length, a cross-sectional configuration, curvature information, harness modeling information (multiple connected structure data; various types of data for modeling a harness as harness parts which are a plurality of small parts) and others. For example, this harness information 23 is inputted from the keyboard 40 to the CPU 10 (harness information setting unit 11 which will be mentioned later).

In addition, through the use of the mouse 41, a drag manipulation is made on a three-dimensional image of a harness (see FIG. 15) put on the display 30, thereby changing the configuration of the harness, and the drag manipulation is made on a three-dimensional image of a facility element, so a manipulation quantity and manipulation direction of a facility element (three-dimensional image) are inputted to the CPU 10 (simulation unit 12 which will be mentioned later).

Still additionally, a transit position (transit point) of the harness can be set (added/inserted/edited/moved) through the use of the keyboard 40 and the mouse 41. In this embodiment, the transit position of a harness includes a starting position of the harness, an intermediate transit position thereof and an end position thereof, and a transit position of a harness will sometimes be referred to as a transit point.

Yet additionally, when a drag manipulation is made on a three-dimensional image of a harness put on the display 30 through the use of the mouse 41, it is possible to change the configuration of the harness and, further, when a drag manipulation is made on a three-dimensional image of a facility element (component), a manipulation quantity and manipulation direction of the facility element (three-dimensional image) are inputted to the CPU 10 (simulation unit 12 which will be mentioned later).

The characteristic information 206 is information about a physical characteristic of a harness and, in this apparatus, it is information on a rigidity of the harness and, for example, includes a bending rigidity Rf (unit:N•mm$^2$) of the harness, a torsional rigidity Rt (unit:N•mm$^2$) thereof, a linear density A (unit:Kg/mm) and others. For example, this characteristic information 206 is inputted to the CPU 10 (characteristic information setting unit 202).

The three-dimensional CAD unit 60 is for designing a component other than a harness in an apparatus which is an object of design. Moreover, the three-dimensional model data 22 on a component which is a result of the design by the three-dimensional CAD unit 60 is converted into a smaller volume of polygon data and then retained in the memory (component information preserving unit, facility information preserving unit) 20 through the input/output interfaces 52 and 50.

Of the components produced by the three-dimensional CAD unit 60 and of the parts constituting same facility, a part (dynamic part) whose posture and configuration vary will sometime be referred to as a facility element.

Although the external storage unit 70 can be made to have a function to retain the application program 21, the harness information 23 and the characteristic information 206, in this embodiment, a library for retaining the information on a connector part for the connection of a harness together with the information on a harness connection position of the connector part and a posture thereof at that position or a library for retaining the information on a clamp part for fixing the harness together with the information on a harness fixing position of the clamp part and a posture thereof at that position is produced in advance, and the external storage unit 70 is used for storing these libraries in advance.

On the other hand, in the memory 20, there is stored the application program (harness design supporting program) 21 for realizing the functions as a harness information setting unit 11, a simulation unit 12 (including a facility part position calculating unit 121, a harness position/configuration calculating unit 122 and a three-dimensional image producing unit 123), a display control unit 13, a verification unit 14, a three-dimensional model constructing unit 200, a mode selecting unit 201, a characteristic information setting unit 202, a transit position changing unit 203, a transit position setting unit 204, a curvature calculating unit 205 and an expansion unit 15, which are shown in FIG. 1.

Furthermore, by reading out the aforesaid application program 21 from the memory 20 through the bus line 50 for carrying out this application program 21, the CPU 10 realizes the functions (the details will be described later) as the harness information setting unit 11, the simulation unit 12, the display control unit 13, the verification unit 14, the three-dimensional model constructing unit 200, the mode selecting unit 201, the characteristic information setting unit 202, the transit position changing unit 203, the transit position setting unit 204, the curvature calculating unit 205 and the expansion unit 15. That is, it realizes the function as a harness design supporting apparatus according to the present invention.

The above-mentioned application program 21 is furnished in a state recorded in a computer-readable recording medium such as a flexible disk or CD-ROM. Moreover, the computer system 1 reads out the program 21 from this recording medium and transfers it to an internal storage unit (memory 20) or the external storage unit 70 for storing therein before using. Still moreover, it is also acceptable that the program 21 is recorded in a storage unit (recording medium), for example, a magnetic disk, an optical disk or a magneto optical disk and it is furnished from the storage unit through a communication path to the computer system 1.

In this embodiment, the "computer" is a concept including a hardware and an operation system and signifies a hardware operating under control of the operation system. Moreover, in a case in which the operation system is unnecessary and the hardware is operated by the application program itself, the hardware itself corresponds to the computer. The hardware has at least a microprocessor such as a CPU and a means for reading out a computer program recorded in a recording medium.

The application program 21 includes program codes which makes the computer (computer system 1) realize the functions as the harness information setting unit 11, the simulation unit 12, the display control unit 13, the verification unit 14, the three-dimensional model constructing unit 200, the mode selecting unit 201, the characteristic information setting unit 202, the transit position changing unit 203, the transit position setting unit 204, the curvature calculating unit 205 and the expansion unit 15. Moreover, it is also acceptable that a portion of the functions is realized by the operation system instead of the application program 21.

In addition, as the recording medium in this embodiment, it is also possible to employ, in addition to the above-mentioned flexible disk, CD-ROM, DVD, magnetic disk, optical disk and magneto optical disk, various types of computer-readable mediums including an IC card, ROM cartridge, magnetic tape, punch card, internal storage unit (memory such as RAM or ROM), external storage unit and code-printed matters such as bar code.

Furthermore, a detailed description will be given hereinbelow of the various types of functions (functions as the harness information setting unit 11, the simulation unit 12, the display control unit 13, the verification unit 14, the three-dimensional model constructing unit 200, the mode selecting unit 201, the characteristic information setting unit 202, the transit position changing unit 203, the transit position setting unit 204, the curvature calculating unit 205 and the expansion unit 15).

The harness information setting unit 11 is for setting the above-mentioned harness information 23 and, in fact, it is made to write, as the harness information 23, various values inputted from the external through the use of the keyboard 40 or the like in the memory 20, or to output them to the simulation unit 12. In a case in which a library on a connector part or a clamp part is previously preserved in the external storage unit 70 as mentioned above, it is also possible that the harness information setting unit 11 selects one of the connector part and the clamp part from the libraries in the external storage unit 70 in accordance with the information inputted from the external through the keyboard 40 and the mouse 40 for setting, as the harness information 23, a transit position (starting position, intermediate transit position or end position) of the harness and a posture thereof at that position.

The characteristic information setting unit 202 is for setting the above-mentioned characteristic information 206 and, in fact, as well as the harness information setting unit 11, it is made to write, as the harness information 23, various values inputted from the external through the keyboard 40 or the like in the memory 20, or to output them to the three-dimensional model constructing unit 200.

The mode selecting unit 201 is for selecting a calculation mode for a position of a harness and a shape thereof in the harness position/configuration calculating unit 122, and it is made to select one of a first calculation mode for calculating the harness position and shape through the approximation using the Bezier curve on the basis of one or more transit positions of the harness and the information on postures at the transit positions, included in the harness information 23, and the characteristic information 206 set in the characteristic information setting unit 202 and a second calculation mode for calculating the harness position and shape through the approximation using the Bezier curve on the basis of one or more transit positions of the harness and the information on postures at the transit positions included in the harness information 23. For example, an operator selects/inputs one of the first and second calculation modes through the use of the keyboard 40, the mouse 41 or the like, with, for example, the selection result being written in the memory 20.

The transit position changing unit 203 is made to change a transit position (starting position, intermediate transit position, end position) of a harness set by the harness information setting unit 11, a transit position (intermediate transit position; details will be mentioned later) of a harness set by the transit position setting unit 204 and the posture information at each position. For example, an operator conducts a drag manipulation on a three-dimensional image of a transit position through the use of the mouse 41 or the like so as to input an manipulation quantity of a transit position and a manipulation direction thereof to the CPU 10.

The three-dimensional model constructing unit 200 is for constructing a three-dimensional model of each of a harness and a component on the basis of the harness information 23 set in the harness information setting unit 11, the three-dimensional model data 22 of the component recorded in the memory 20 and the characteristic information set in the characteristic information setting unit 202, and it has the functions as the harness position/configuration calculating unit 122 and the three-dimensional image producing unit 123 as shown in FIG. 1.

The harness position/configuration calculating unit 122 is for calculating a harness route, i.e., a position of a harness and a configuration (shape) thereof, on the basis of a position of a component, the harness information 23 set in the harness information setting unit 11 and the characteristic information 206 set in the characteristic information setting unit 202.

As will be described later, the harness position/configuration calculating unit 122 is made to calculate a position of a harness and a configuration thereof by making an approximation with respect to the harness position and configuration through the use of the Bezier curve on the basis of transit positions of the harness and the information on a posture at each of the positions which are set by the harness information setting unit 11, the transit position setting unit 204 and others.

Moreover, the harness position/configuration calculating unit 122 can calculate the harness position and configuration according to the first calculation mode for calculating the harness position and shape through the approximation using the Bezier curve on the basis of one or more transit positions of the harness and the information on postures at the transit positions, included in the harness information 23, and the characteristic information 206 set in the characteristic information setting unit 202 and the second calculation mode for calculating the harness position and shape through the approximation using the Bezier curve on the basis of one or more transit positions of the harness and the information on postures at the transit positions included in the harness information 23, and it is made to calculate the harness position and configuration according to one calculation mode selected by the mode selecting unit 201.

First, a description will be given hereinbelow of, in the harness position/configuration calculating unit 122, a method of calculating the harness position and configuration according to the first calculation mode.

Figure 3:
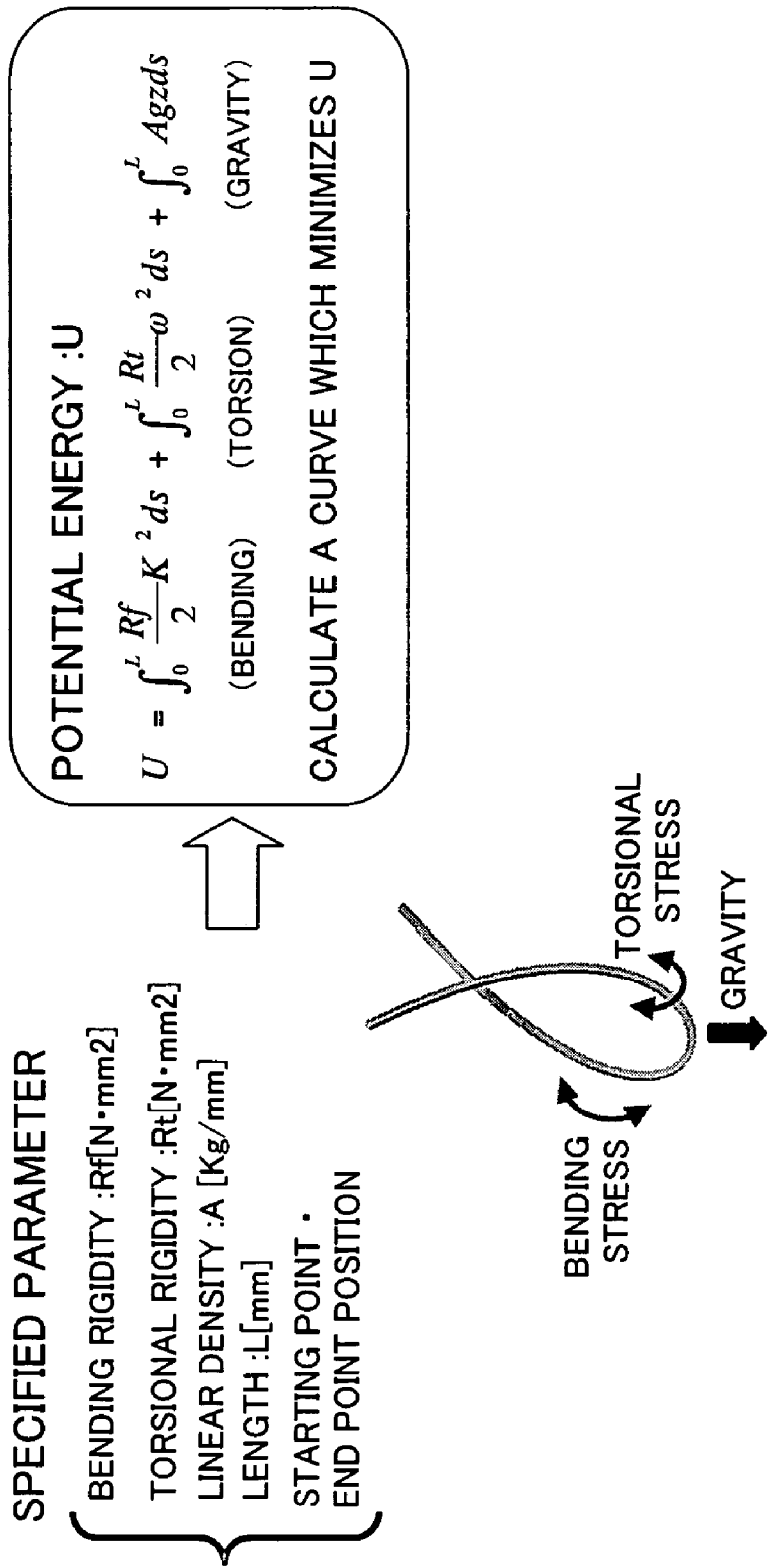
FIG. 3 is an illustration for explaining a harness designing method based upon a first calculation mode in a harness design supporting apparatus according to an embodiment of the present invention.

FIG. 3 is an illustration for explaining a harness designing method based on the first calculation mode in a harness design supporting apparatus according to an embodiment of the present invention. The first calculation mode is made to calculate a position/configuration of a harness in consideration of a physical characteristic (rigidity) of the harness and, as shown in FIG. 3, is made to determine a curve shape so that the potential energy of the harness (that is, the sum of the strain energy stemming from the bending and torsion of the harness and the potential energy due to the gravity) reaches a minimum.

Incidentally, the calculation of a harness route by obtaining a route so as to minimize the strain energy due to the bending and torsion of the harness and the potential energy due to the gravity can be made with reference to the following two articles.

(1) Wakamatsu, H, Hirai, S, and Iwata, K, Modeling of Linear Objects Considering Bend, Twist, and Extensional Deformations, IEEE Int. Conf. on Robotics and Automation, 1995

(2) Hirai, McCarragher, Study about Hysteresis at Deformations of Linear Objects Accompanied by Torsion, 15th Japanese Robots society Arts and Sciences Lecture Pre-Draft collection, pp. 289-290, 1997

In a case in which a curve configuration of a harness is expressed by a tertiary Bezier curve, when the positions of four control points for uniquely determining this curve are respectively taken as $Q_1$, $Q_2$, $Q_3$, and $Q_4$, a curve C corresponding to the position/posture of the harness can be expressed by the following equation (1).

$$r(t) = (1-t)^3 Q_0 + 3(1-t)^2 t Q_1 + 3(1-t) t^2 Q_2 + t^3 Q_3 \tag{1}$$

where r(t) signifies an equation expressing a three-dimensional position, and t designates a variable (0≦t≦1) expressing a position on a curve, and t=0 at the starting point of the curve C and t=1 at the end point thereof.

Subsequently, a configuration is obtained so as to minimize the potential energy of the harness. The strain energy due to bending of the harness can be expressed by the following equation (2).

$$\frac{1}{2}\int_0^1 R_f \cdot k^2 \, dt \tag{2}$$

where $R_f$: bending rigidity (unit:N•mm²), k:curvature.

Moreover, the strain energy due to torsion of the harness can be expressed by the following equation (3).

$$\frac{1}{2}\int_0^1 R_t \cdot w^2 \, dt \tag{3}$$

where $R_t$: torsional rigidity (unit:N•mm²), W:torsion rate.

Still moreover, the potential energy due to the gravity can be expressed by the following equation (4).

$$\int_0^1 Agz \, dt \tag{4}$$

where A: linear density (unit:Kg/mm), g:gravitational acceleration, z:height.

Yet additionally, the entire potential energy U is expressed as the sum of the above-mentioned equations (2), (3) and (4) as indicated by the following equation (5).

$$U = \frac{1}{2}\int_0^1 R_f \cdot K^2 \, dt + \frac{1}{2}\int_0^1 R_t \cdot w^2 \, dt + \int_0^1 Agz \, dt \tag{5}$$

where the curvature k, the torsion rate w and the height z are determined from the curve configuration equation.

Figure 4:
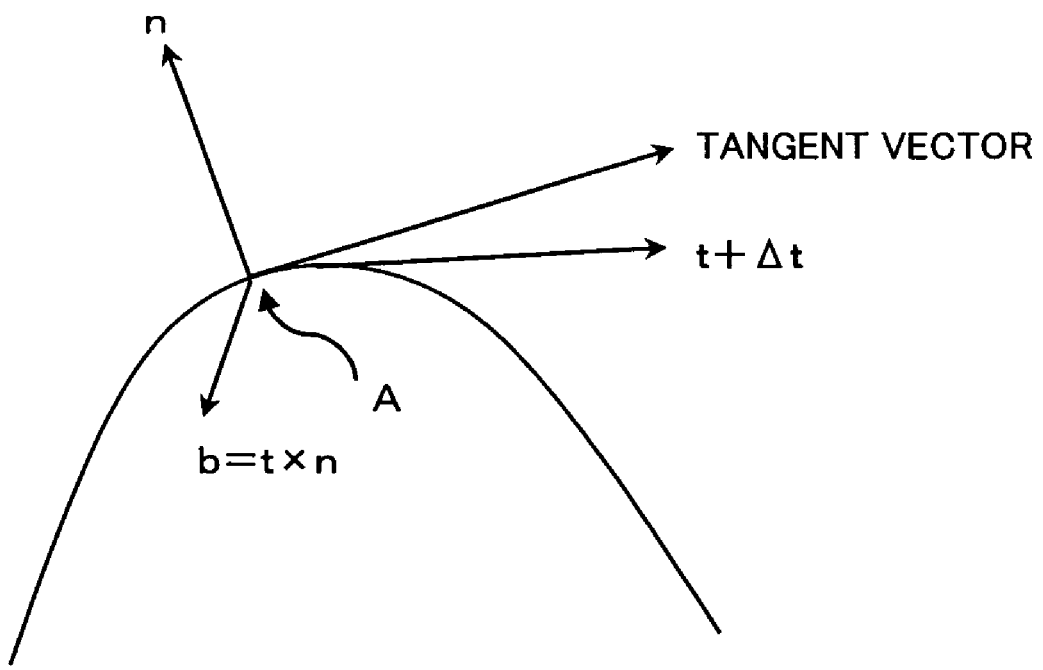
FIG. 4 is an illustration of the definition of a vector on a harness curve to be used for the calculation of a harness route in a harness design supporting apparatus according to the present invention.

FIG. 4 is an illustration of the definition of a vector on a harness curve to be used for the calculation of a harness route in a harness design supporting apparatus according to the present invention. As shown in FIG. 4, let it be assumed that a tangent vector at an arbitrary point A on a harness curve is taken as t and a tangent vector at a point separated by a minute zone from the point A on the same harness curve is taken as t+Δt. Moreover, let it be assumed that a vector perpendicular to the vector t at the point A and existing in the same plane as the vector t and the vector t+Δt is taken as n and a vector b is expressed by a vector product t×n.

In this case, the curvature k, the torsion rate w and the height z can be expressed by the following equations (6) to (8).

$$k = \frac{(n \cdot \ddot{r})}{\dot{r}} \tag{6}$$

$$w = \frac{(b \cdot \dddot{r})}{k|\dot{r}|^3} \tag{7}$$

$$z = z \text{ component of } r(t) \tag{8}$$

where
$\dot{r}$: linear differential of function r(t)
$\ddot{r}$: quadratic differential of function r(t)
$\dddot{r}$: cubic differential of function r(t)

From the above, the potential energy U can be expressed as the functions of the control points $Q_0$, $Q_1$, $Q_2$, and $Q_3$, which are parameters of the Bezier curve.

In this case, when the starting point of a harness is allocated to $Q_0$ and the end point thereof is allocated to $Q_3$, $Q_0$ and $Q_3$, become already known values. Moreover, the length L of the harness can be expressed by the following equation (9). The length L of the harness is given by the harness information setting unit 11.

$$L = \int_0^1 \sqrt{\dot{r}_x^2 + \dot{r}_y^2 + \dot{r}_z^2} \, dt \tag{9}$$

$\dot{r}_x$: X component of $\dot{r}$
$\dot{r}_y$: y component of $\dot{r}$
$\dot{r}_z$: z component of $\dot{r}$ On the basis of the condition of the aforesaid equation (9), $Q_1$ and $Q_2$, which minimize the equation (5), are obtained by acquiring values, which minimize U+λL (λ: Lagrange's multiplier) through the use of the Lagrange's method of undetermined multiplier.

On the basis of the $Q_0$, $Q_1$, $Q_2$ and $Q_3$ thus acquired, the curve C corresponding to a position/posture of a harness can be determined in accordance with the above-mentioned equation (1).

Secondly, a description will be given hereinbelow of a method of calculating a position of a harness and a configuration thereof according to the second calculation mode in the harness position/configuration calculating unit 122.

Figure 5:
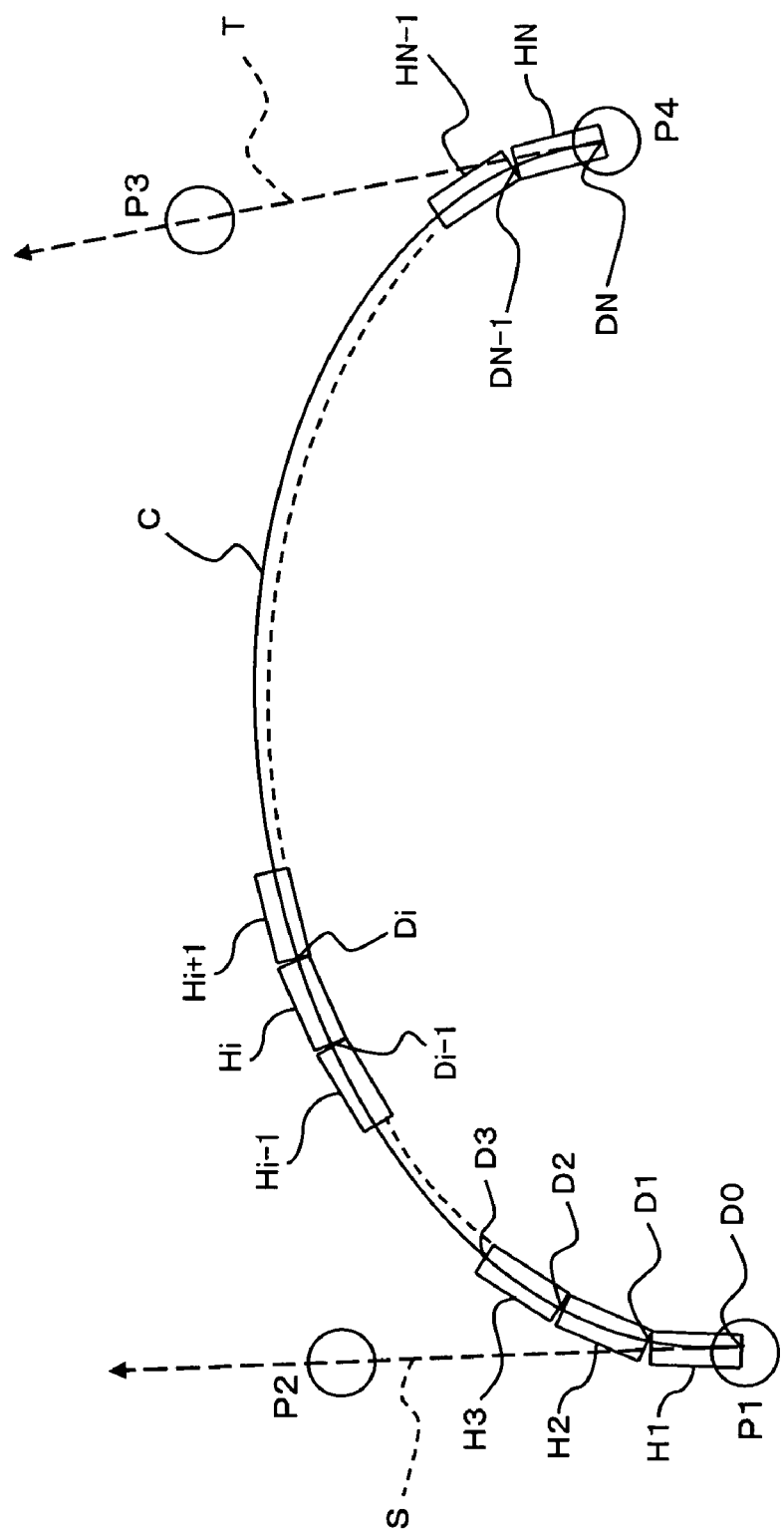
FIG. 5 is an illustration for explaining a harness modeling method according to this embodiment and further for explaining an approximation method for a position and configuration of a harness, based upon the Bezier curve, which is to be implemented in a harness position/configuration calculating unit according to this embodiment.

FIG. 5 is an illustration for explaining a harness position/configuration approximating method based on the Bezier curve which is to be implemented in the harness position/configuration calculating unit 122 according to this embodiment.

A harness connects from one connector part up to a different connector part. In this embodiment, such a harness is handled as a harness model in which a large number of harness parts are connected as mentioned later. A starting position of the harness, an end point thereof, a posture at each position (position/posture data S and T on the starting point and the end point), a length L of the harness, across-sectional configuration A and multiple connected structure data are set as the harness information for each harness. On the basis of the position/posture data S, T and the length L included in this harness information 23, the harness position/configuration calculating unit 122 can determine a curve C corresponding to the position/posture of the harness as shown in FIG. 5.

Moreover, the three-dimensional image producing unit 123 connects the harness parts having the specified cross-sectional configuration A along the curve C, thereby expressing a three-dimensional image of the harness.

Incidentally, in fact, the position/posture data S and T on the starting point and the end point are given as vector information as indicated by a dotted-line arrow in FIG. 5.

The aforesaid curve C can easily be determined through the use of the tertiary Bezier curve.

The tertiary Bezier curve is uniquely determined with respect to four points (control points). As shown in FIG. 5, the four points are taken as P1, P2, P3 and P4, and the points P1 and P4 are allocated to the starting point of a harness and an end point thereof (positions corresponding division points D0 and DN, respectively).

Subsequently, on the basis of the postures at the starting point P1 and the end point P4 (harness directions at these points; tangent directions of the harness), the points P2 and P3 are determined to be on the directional vectors S and T from the points P1 and P4.

When the points P2 and P3 are shifted on the directional vectors S and T, since the shape of the curve C changes and the length of the curve C varies, the positions of P2 and P3 are determined while P2 and P3 are shifted so that the harness has the length L specified by the harness information 23, and the configuration of the curve C is determined.

At this time, if P2 and P3 are separately shifted, although two parameters become necessary for the determination of the positions of P2 and P3, when P2 and P3 are shifted so that the distance (P1-P2) between P1 and P2 and the distance (P3-P4) between P3 and P4 become the same specified length d at all times, the positions of P2 and P3 can be determined by only one parameter of the specified length d.

By obtaining the control points P1, P2, P3 and P4 in this way, the Bezier curve for the formation of the harness is determined to settle the position/configuration of the harness.

Furthermore, this apparatus can design a route (position and configuration) of a harness in a state where the overall length L of the harness is fixed.

As a method of designing a route of a harness, in a case in which, for example, a starting point of the harness and an end point thereof are previously handled as an object of design and coupled to connectors determined in disposition, after the staring point of the harness and the end point thereof are specified, an intermediate transit point (intermediate transit position, transit position) can be set between the starting point and the end point.

In this case, the position of the intermediate transit point, the overall length of the harness and the disposition of the route are used as design items. When the overall length of the harness and the position of the transit point are temporarily determined, as a design work, the position of the intermediate transit point is finely adjusted to determine the arrangement of the route. For achieving this design work, it is effective to employ a harness route calculating method in which only the overall length of the harness and an intermediate transit position (intermediate transit point) are bound and the length between a transit point and an intermediate transit point (between a transit point and a transit point) is changed without restraint.

Figures 6A, 6B:
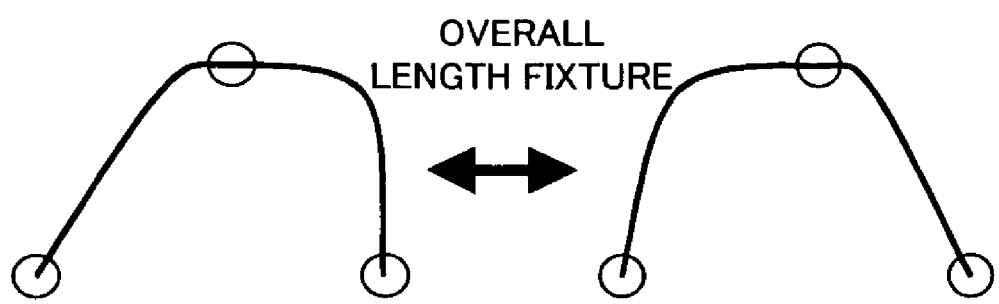
FIGS. 6A and 6B are illustrations of an example of a harness route to be produced in a harness design supporting apparatus according to an embodiment of the present invention.

FIGS. 6A and 6B are illustrations of an example of a harness route to be produced in a harness design supporting apparatus according to an embodiment of the present invention. In the example shown in FIGS. 6A and 6B, the overall length of a harness is fixed to a predetermined length and the harness is held in a state loosely inserted at an intermediate transit point thereof so that the harness is movable in only its longitudinal directions and the position of the intermediate transit point is arbitrarily changeable.

For calculating a harness route, where the position of the intermediate transit point is changeable (movable), in a short time, the harness position/configuration calculating unit 122 proportionally distributes the difference between the sum total of the shortest distances between the respective transit positions on a passage route of the harness and the overall length of the harness among the respective transit positions for calculating the position of the harness and the configuration thereof. Thus, the repeating calculation for successively varying the transit point becomes unnecessary, and the calculation of the harness route can be made through one calculation, which shortens the time required for the design of the harness route.

In addition, when transit position changing unit 203 changes the harness transit position and the posture information, the harness position/configuration calculating unit 122 proportionally distributes the difference (that is, the extra length of the harness) between the sum total of the shortest distances between the respective transit positions on the passage route of the harness and the overall length of the harness among the respective transit positions on the basis of the harness transit position and the posture information, after changed by the transit position changing unit 203, and the harness transit position and posture information included in the harness information 23, thereby calculating the position of the harness and the configuration thereof.

Referring to the flow chart (steps A10 to A130) of FIG. 7, a description will be given hereinbelow of a method of designing a harness route at the fixture of the overall length in this harness design supporting apparatus.

First of all, an operator sets the overall length (La) of a harness through the use of the harness information setting unit 11 (step A10), and sets a plurality of transit points of the harness (step A20). In this embodiment, the transit points include the starting point of the harness, an intermediate transit point thereof and the end point thereof, with each transit point being designated at a mark Pi (where i denotes a natural number, and $1 \leq i \leq N$; N represents the sum total of transit points).

Figure 7:
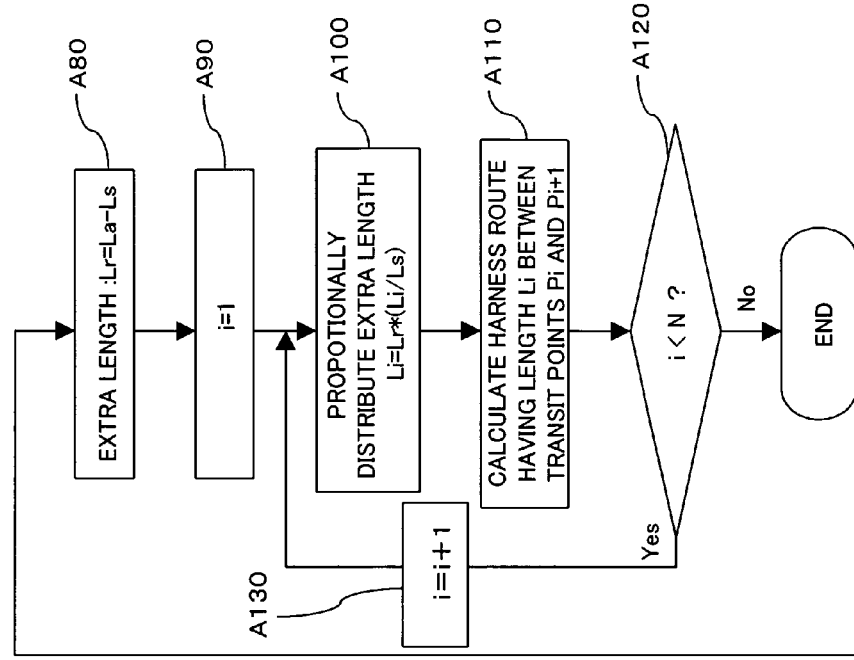
FIG. 7 is a flow chart for explaining a harness route setting method at the fixture of the overall length in this harness design supporting apparatus.
Figure 7:
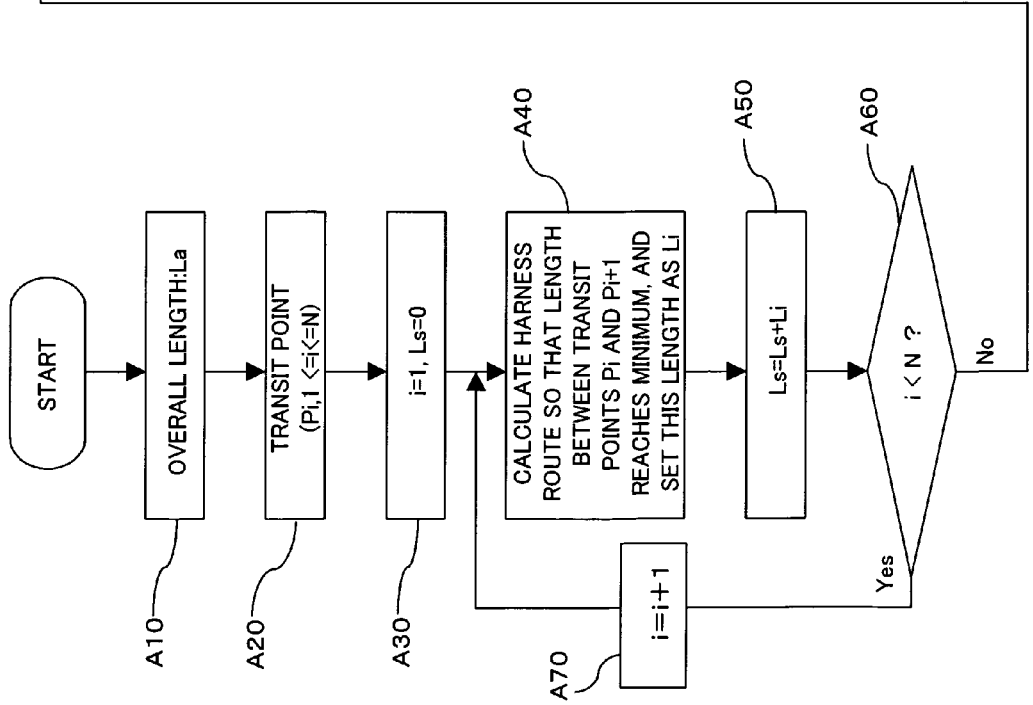

In FIG. 7, for the explanation, the overall length of the harness is designated at La and the harness length when the respective transit points on the harness route are connected to take the shortest course is designated at Ls. The harness length Ls is obtainable as the sum total of the shortest route lengths between the respective transit points on a passage route of the harness. That is, when the shortest route length between the transit point Pi of the harness and the transit point Pi+1 adjacent to the transit point Pi on the harness route is taken as Li, the shortest harness length Ls is expressible by the following equation.

$$Ls = \sum_{i=1}^{N} Li$$

First, the values of i and Ls are initialized, that is, set at i=1 and Ls=0 (step A30), and the shortest route length Li between the transit point Pi and the transit point Pi+1 is calculated (step A40) and the value of Ls is set at Ls=Ls+Li (step A50).

A decision is made as to whether or not i is smaller than N (step A60) and, if i is smaller than N (see YES route of step A60), 1 is added to i (step A70), and the operational flow returns to the step A40. If i is equal to or more than 1 (see NO route of step A60), the extra length Lr of the harness is obtained through the calculation of Lr=La–Ls (step A80).

Following this, after the value of i is again initialized (i=1) (step A90) and the extra length Lr of the harness is proportionally distributed among the respective transit position (step A100), before calculating the length Li'between the transit points of the harness. Concretely, The harness length Li' between the respective transit points is calculated by calculating Li'=Lr×(Li/Ls).

The harness position/configuration calculating unit 122 calculates a harness route between the transit point Pi and the transit point Pi+1 through the use of the above-mentioned method on the basis of the harness length Li' between the transit point Pi and the transit point Pi+1 calculated in this way, the positions of the transit point Pi and the transit point Pi+1, the information on the posture at each position and the characteristic information 206 (step A110).

Moreover, a decision is made as to whether or not i is smaller than N (step A120) and, if i is smaller than N (see YES route of step A120), i is incremented by 1 (step A130), and the operational flow returns to the step A100. Still moreover, if i is equal to or larger than 1 (see NO route of step A120), the processing comes to an end.

Incidentally, although it is also acceptable that the harness length between the transit points is varied to find the smoothest harness curve as a whole, since the combinations of the lengths between the transit points are unlimited and the evaluation on the smoothness is difficult, the strict solution to the smoothest harness curve does not contribute to great advantages for the labor (calculation time). For this reason, the method in which only the harness route is calculated roughly and obtained as mentioned above and the operator (designer) adjusts the details can shorten the design time and makes easy use to the operator.

In addition, also in a case in which the transit position changing unit 203 changes the transit position of the harness and the posture information thereon, the harness position/configuration calculating unit 122 calculates the position of the harness and the configuration thereof on the basis of the transit position of the harness and the posture information after changed by the transit position changing unit 203.

Still additionally, also in a case in which the transit position setting unit 204, which will be mentioned later, sets a transit position of the harness (intermediate transit position) and posture information, the harness position/configuration calculating unit 122 calculates the position of the harness and the configuration thereof on the basis of the transit position of the harness and the position information, set by the transit position setting unit 204, and the transit position of the harness and the information on the posture at each transit position included in the harness information 23.

In this connection, also for the re-calculation of the harness position/configuration in a case in which a transit position of a harness and others are set by the transit position setting unit 204 or when the transit position of the harness and others are changed by the transit position changing unit 203, the harness position/configuration calculating unit 122 is made to calculate (re-calculate) the position of the harness and the configuration thereof according to the calculation mode selected by the aforesaid mode selecting unit 201.

Moreover, it is also appropriate that, when the transit position of the harness or the like are changed by the transit position changing unit 203, the harness position/configuration calculating unit 122 re-calculates the position of a harness and a configuration thereof immediately after the change of the transit position of the harness or the like (real-time processing).

That is, in a state where a transit point model manipulable by a user is displayed on a three-dimensional model (see FIG. 15) so that an operator can make a fine adjustment while arbitrarily moving this transit points whenever the transit point is moved (changed), the re-calculation of the harness route is immediately made on the basis of the transit point after the movement, which enables the harness route to be adjusted in a real-time fashion. Incidentally, it is preferable to, along with this re-calculation of the harness route, simultaneously carry out the curvature calculation by the curvature calculating unit 205 which will be mentioned later and various verifications by the verification unit 14.

Thus, at the design of a harness route, when a change of the transit point position is made in determining a harness route, which does not create a problem in curvature or interference, while making the fine adjustment on the position of a transit point of a harness, the operator can immediately confirm the harness route reflecting the change, which provides high convenience.

Still moreover, it is also appropriate to, when a plurality of transit positions of a harness or the like are changed by the transit position changing unit 203, collectively carry out the calculation (re-calculation) of the positions of the harness and the configurations thereof with respect to the plurality of changed transit positions or the like (interactive processing).

In general, in most cases, a designer (operator) can make a decision, on the basis of his/her experiences, as to how a transit position of a harness is to be moved (changed) and, hence, it is sometimes possible to achieve satisfactory results as long as, after the movement (change) processing is conducted with respect to a plurality of transit points, the calculation of the harness route can be made collectively with respect to these plurality of transit points and the curvature and the interference can be checked.

At the design of a harness route, in a case in which the computer system 1 does not have a high performance for determining a harness route while making the fine adjustment on the position of a transit point of the harness, the re-calculation of the harness route takes time and, hence, difficulty is sometimes experienced in conducting the above-mentioned real-time processing. In this case, after the operator changes (moves) the positions of a plurality of transit points, the harness position/configuration calculating unit 122 calculates the harness route collectively with respect to the plurality of moved transit points, thereby enabling the adjustment of the harness route interactively.

Yet moreover, in a case in which the transit position of a harness and posture information are changed by the transit position changing unit 203, the harness position/configuration calculating unit 122 is made to calculate the position of the harness and the configuration thereof through the use of the information on the harness position and configuration before the change.

In this harness design supporting apparatus, for the harness route calculation according to the first calculation mode, the harness position/configuration calculating unit 122 conducts a convergence calculation to obtain a route whereby the harness potential energy U reaches a minimum. Since, for carrying out this convergence calculation in a short time, it is effective that the initial value is close to the true value, it is desirable to assign an accurate route as the initial value.

Accordingly, for example, in a case in which the transit position changing unit 203 carries out the fine adjustment on a portion of the transit point positions on the already produced harness route, it is possible to refer to the harness route previously calculated. Thus, when the convergence is made with the previously calculated harness route as the initial value, the shortening of the calculation time becomes feasible and the position of the harness and the configuration thereof are obtainable in a short time.

In addition, the above-mentioned harness position/configuration calculating unit 122 and three-dimensional image producing unit 123 also have a function to realize the simulation unit 12.

The simulation unit 12 is made to construct three-dimensional facility models of a harness and a facility element on the basis of the harness information 23 set in the harness information setting unit 11 and the three-dimensional model data 22 on the facility element in the memory 20 for making a simulation through the use of these three-dimensional facility models in a state where an operation of the harness is interlocked with an operation of the facility element.

As will be mentioned later with reference to FIGS. 17 and 5, this simulation unit 12 handles a harness as a three-dimensional model having a structure in which a plurality of harness parts obtained by dividing the harness are mutually connected with a rotary joint having three-degree-of-freedom and, as shown in FIG. 1, has the functions as the facility element position calculating unit 121, the harness position/configuration calculating unit 122 and the three-dimensional image producing unit 123. Moreover, the simulation unit 12 has a function to, when a recognition is made that the harness is unrelated to an operation of the facility element and is a static part, deal with the harness as one part instead of being handled as a plurality of harness parts.

The facility element position calculating unit 121 is for calculating a position of a facility element on the basis of the three-dimensional model data 22 on the facility element on a predetermined cycle for carrying out the simulation on an operation of the facility element.

The harness position/configuration calculating unit 122 is for calculating a position of a harness and a configuration thereof on the basis of the position of the facility element calculated in the facility element position calculating unit 121 and the harness information 23 and, in this embodiment, it is made to calculate the harness position and configuration through the approximation using the Bezier curve on the basis of the starting position and end position of the harness and the information on the posture at each position included in the aforesaid harness information 23.

The three-dimensional image producing unit 123 is for producing three-dimensional images of a component and a harness on the basis of the harness position and configuration calculated in the harness position/configuration calculating unit 122, the harness information 23 set in the harness information setting unit 11, the characteristic information 206 and the three-dimensional model data 22 on the component, and then outputting this three-dimensional image. For example, a three-dimensional image is an image representing a three dimensional appearance.

Moreover, the three-dimensional image producing unit 123 is made to produce three-dimensional images of a component (facility element) and a harness on the basis of the position of the facility element calculated in the facility element position calculating unit 121, the harness position and configuration calculated in the harness position/configuration calculating unit 122, the harness information 23, the characteristic information 206 and the three-dimensional model data 22 on the component (facility element) and further to output this three-dimensional image as a simulation result to the display control unit 13, and the display control unit 13 puts the three-dimensional image from the three-dimensional image producing unit 123 on the display 30.

In addition, as shown in FIG. 5, the three-dimensional image producing unit 123 according to this embodiment makes the connections of a plurality of harness parts forming a three-dimensional model of a harness along the Bezier curve obtained as the position of the harness and the configuration thereof by the harness position/configuration calculating unit 122, thereby forming a three-dimensional image of the harness. In accordance with across-sectional configuration of the harness included in the harness information 23, the three-dimensional image producing unit 123 is made to produce a three-dimensional image of the harness having this cross-sectional configuration.

The curvature calculating unit 205 is for calculating a curvature (or radius of curvature) of a harness on the basis of the calculation results on the harness position and configuration obtained in the harness position/configuration calculating unit 122.

The verification unit 14 is for verifying the interference with a component and a harness which are an object of design. In general, since a harness is frequently incorporated into an apparatus which is an object of design, this interference check enables the conformation as to whether the harness is accommodated in the design object apparatus or whether the harness is laid without catching in a component or the like in the design object apparatus.

Moreover, the verification unit 14 is made to carry out the dynamic verification on the harness on the basis of the simulation result obtained by the simulation unit 12 as occasion calls and, in this embodiment, as mentioned later, it verifies the interference between the harness and the facility element, the length of the harness and the curvature of the harness.

Still moreover, the verification unit 14 is made to carry out the verification as to whether the minimum value of the minimum radius of curvature of a harness route exceeds a previously set allowable minimum radius of curvature.

The harness is required in the specification so as to be made such that the radius of curvature of the harness route exceeds a predetermined value (allowable minimum radius of curvature). Accordingly, in this harness design supporting apparatus, the curvature calculating unit 205 is made to calculate the radii of curvature throughout the entire harness for obtaining the minimum value thereof and the position (position at which the curvature becomes at a maximum) on the harness.

Through the use of the Bezier curve, it is possible to calculate a curvature at an arbitrary position on a curve. This enables a portion of the largest curvature (steep bending) on a harness to be detected, so the verification on the degree of bending in a curvature configuration becomes feasible. That is, in this embodiment, when the curvature is calculated whenever the configuration changes, the verification unit 14 can carry out the dynamic verification on a curvature of a harness in state where a facility is moved.

In this connection, for the approximation of a harness configuration using the Bezier curve, it is also acceptable to specify the curvature of the harness instead of specifying the length L of the harness. In this case, while the points P2 and P3 are shifted on the directional vectors S and T, the positions of the points P2 and P3 are determined so that the curvature of the curve C becomes a specified curvature. Moreover, at this time, it is also acceptable that, for the determination of the configuration of the curve C, the positions of the points P2 and P3 are determined so that the curvature of the curve C reaches a minimum.

In addition, for example, a result of the verification by the verification unit 14 is put through the display control unit 13 on the display 30. For example, for making clear the interference state (interference portion), it is displayed on the three-dimensional model in the display 30 (see FIG. 16). The result of the interference check is also transferred to the transit position setting unit 24.

Still additionally, in a case in which the minimum radius of curvature calculated in the curvature calculating unit 205 is smaller than an allowable minimum radius of curvature, the verification unit 14 makes the display control unit 13 put a dialogue as a warning on the display 30 or it makes a speaker (not shown) generate a warning sound. This enables an operator to reliably verify the curvature of a harness.

Yet additionally, it is also appropriate that the verification unit 14 makes the display 30 indicate, on a three-dimensional model, the position at which the radius of curvature on a harness route reaches a minimum (or the position where the curvature reaches a maximum). Thus, the operator can easily make a decision on the transit point to be adjusted, which improves the design quality.

If the result of the verification by the verification unit 14 shows that a component and a harness interfere with each other, for preventing the interference between the harness and the component, the transit position setting unit 204 sets a transit position so that the harness is positioned on the surface of the component at the interference position in parallel with the surface of the component.

When the starting point of a harness, the end point thereof and the overall length thereof are specified for the calculation of a harness route, there is a possibility that the harness route is calculated to make an interference with a component in an apparatus which is an object of design.

In a case in which such an interference occurs in the harness route, the operator confirms the interference portion on the display 30 and appropriately adds a transit point of the harness so as to eliminate the interference, thereby designing a route with no interference as a result. On the other hand, in this embodiment, the transit position setting unit 204 automatically carries out this transit point adding operation, which enhances the operation efficiency.

Figures 8A, 8B:
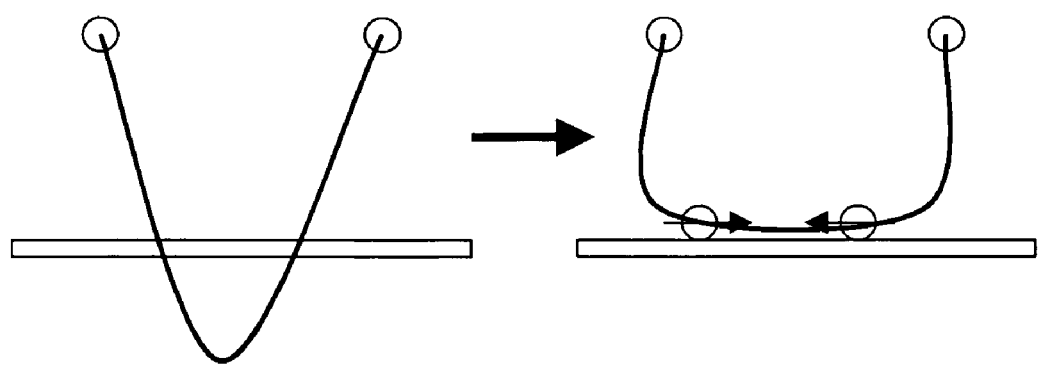
FIGS. 8A and 8B are illustrations for explaining a method of adding a harness transit point to a harness route in a harness design supporting apparatus according to an embodiment of the present invention.

FIGS. 8A and 8B are illustrations for explaining a method of adding a transit point of a harness on a harness route in a harness design supporting apparatus according to an embodiment of the present invention. FIG. 8A is an illustration of an interference state before the addition of a transit point, and FIG. 8B is an illustration of a state after the addition of a transit point.

After the harness position/configuration calculating unit 122 calculates a harness route on the basis of the starting point of a harness, the endpoint thereof and the length thereof, the verification unit 14 finds the presence or absence of interference, an interference part and a position thereof between a part model of a component constituting the design object apparatus and a harness model through the use of its interference check function.

Moreover, if an interference occurs as shown in FIG. 8A, the transit position setting unit 204, as shown in FIG. 8B, sets a transit point(s) on a surface of a component at the interference position and sets posture information so that the harness is positioned in parallel with the surface of the component at this transit point.

After the transit position setting unit 204 sets a new transit point(s) of a harness on a component in this way, the harness position/configuration calculating unit 122 conducts the re-calculation through the use of the aforesaid overall fixture route calculating method, thereby producing a smooth route with no interference.

The expansion unit 15 converts/expands a three-dimensional model of a harness, obtained as a result of the simulation by the simulation unit 12, into a two-dimensional layout view (plan view) and outputs the resultant two-dimensional layout illustration to the external or preserves it in the memory 20 or the external storage unit 70.

In this embodiment, the attribute information on the harness (for example, connector, clamp, coat, signal line, From To list, and others) is previously stored together with the harness information 23 in the memory 20, and the display control unit 13 is made to indicate the attribute information together with a harness image on the display 30 in accordance with instructions from the keyboard 40 and the mouse 41.

[2] About Operation and Effect of Harness Design Supporting Apparatus according to This Embodiment

[2-1] About Harness Design Function

Figure 9:
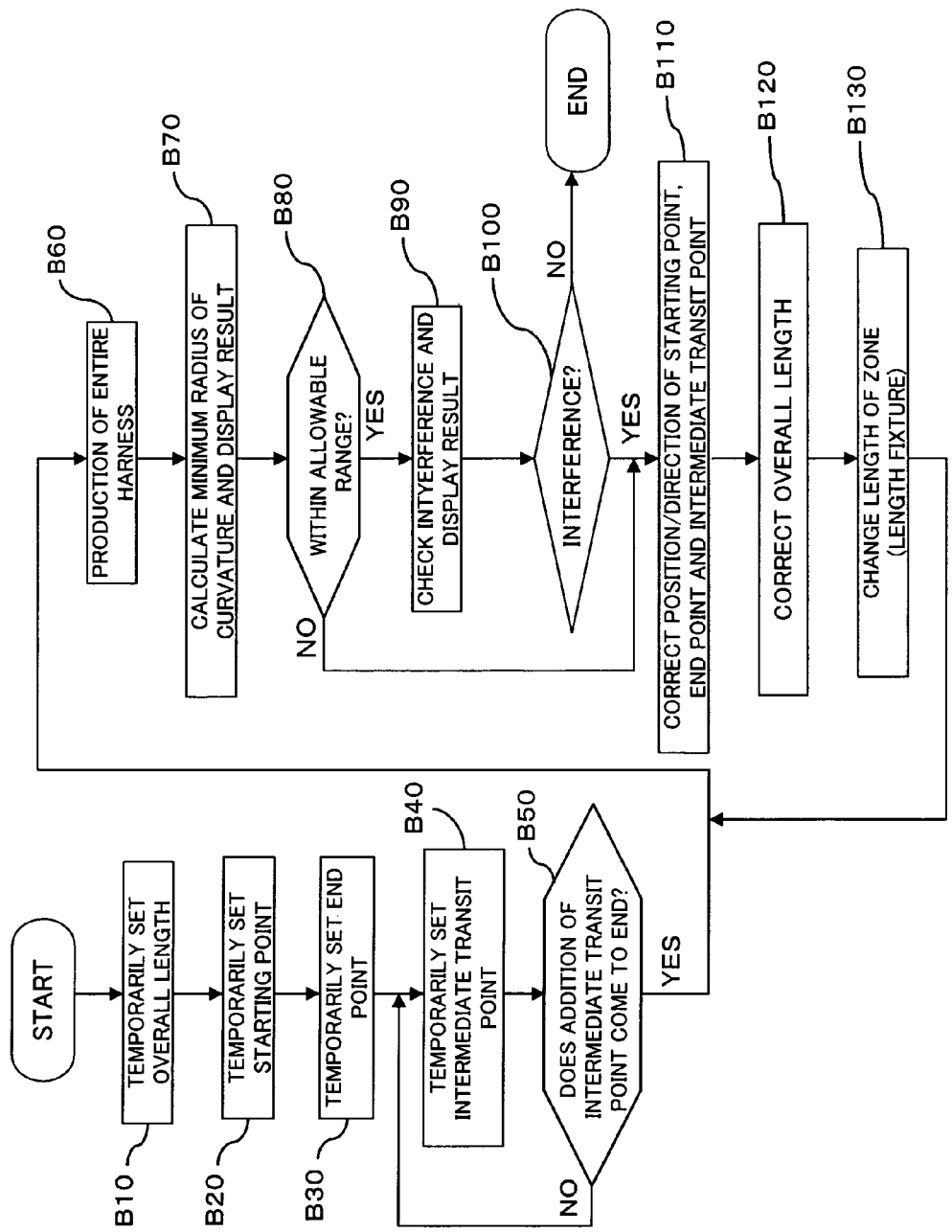
FIG. 9 is a flow chart for explaining a harness designing method in a harness design supporting apparatus according to an embodiment of the present invention.

First, with reference to FIGS. 10 to 16 and according to the flow chart (steps B10 to B130) of FIG. 9, a description will be given hereinbelow a harness designing method in a harness design supporting apparatus according to an embodiment of the present invention.

The following is an example of a harness making a connection between a connector c1 (starting point) and a connector c2 (endpoint) and an example of designing a harness passing through a specified position (transit point) of a part cube2 (component).

An operator first temporarily sets (temporary setting) the overall length of the harness (step B10).

Figure 10:
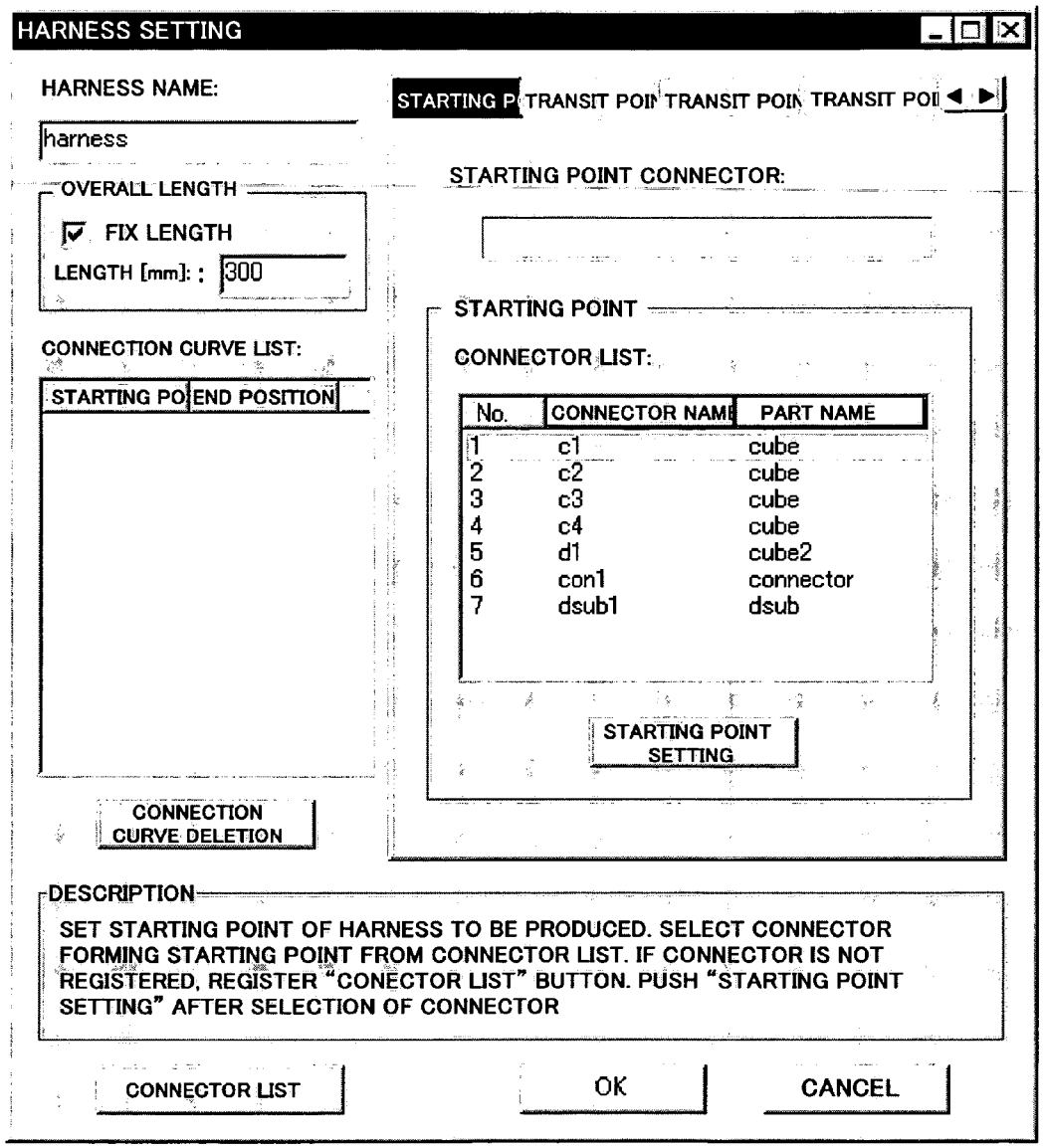
FIGS. 10 to 16 are illustrations of examples of display screens to be put on a display unit in a harness design supporting apparatus according to an embodiment of the present invention.

FIG. 10 is an illustration of an example of a display screen D1 to be put on the display 30 in a harness design supporting apparatus according to an embodiment of the present invention and is an illustration of an example of a starting point setting screen for setting a starting point of a harness as the harness information 23.

In this harness design supporting apparatus, as shown in FIG. 10, the "fix length" is selected in the item "overall length", thereby designing a harness whose overall length is fixed to a predetermined value, and a desired value is inputted in the item "length (mm)", thereby arbitrarily setting the overall length of the harness. The operator sets the overall length of the harness in this item when needed.

Following this, the operator selects a connector forming the starting point of the harness in this display screen D1 (temporary setting of the starting point; step B20).

In this harness design supporting apparatus, as shown in FIG. 10, a list of connectors which can become the starting point of the harness is previously registered as a connector list, and the operator can select the connector to be set as the starting point from the connector list through the keyboard 40 or the mouse 41. On the other hand, if a desired connector is not registered in the connector list, a "connector list" button is selected in the display screen D1, and a list of the available connectors (not shown) is displayed for registering a desired connector.

After the selection of the connector forming the starting point of the harness, the operator selects a "starting point setting" button to set the starting point of the harness on the basis of the mounting position, mounting direction (posture information) of the connector or the like.

Subsequently, the operator sets the end point of the harness (temporary setting of the end point; step B30).

Figure 11:
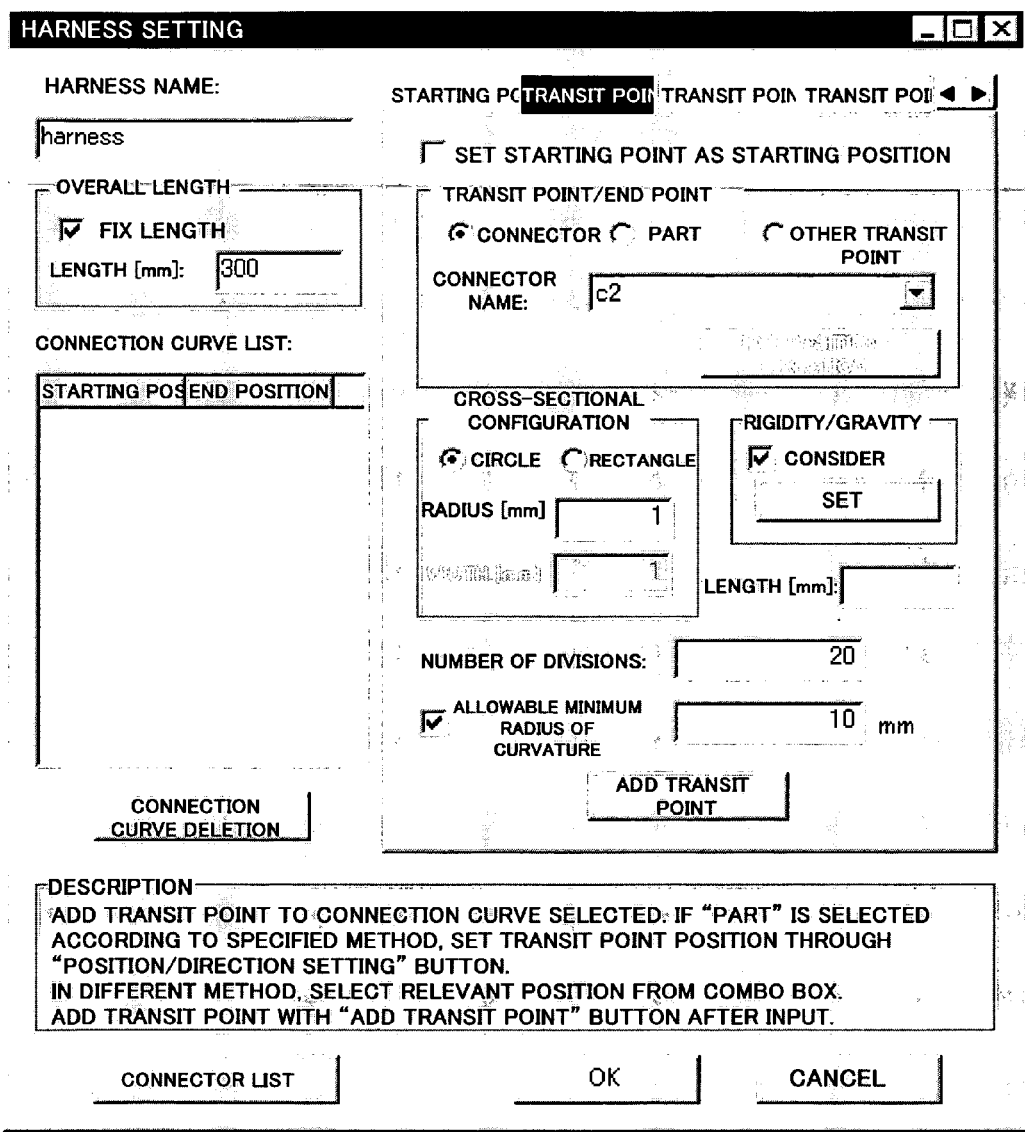

FIG. 11 is an illustration of an example of a display screen D2 to be put on the display 30 in a harness design supporting apparatus according to an embodiment of the present invention and an illustration of an example of a transit point adding screen for setting (adding) an endpoint (transit point; transit position) of a harness as the harness information 23. The transit point of the harness includes the end point.

For example, the operator sets the endpoint of the harness in the display screen D2 shown in FIG. 11.

In this harness design supporting apparatus, the transit point of the harness can be set through the use of a connector, a part or another transit point. For example, when the end point (transit point) is set through the use of a connector, as shown in FIG. 11, the connector registered in advance in this apparatus is displayed in a combo box, and the operator selects a desired connector as a transit point through the use of this combo box, thus easily setting the end point.

In addition, when the end point (transit point) is set using a part or another transit point, for example, a desired part is selected as a transit point from three-dimensional model data (not shown) of an object of design, appearing as a different window together with this screen on the display 30, through the use of the mouse 41 or the like, thus easily setting the end point (transit point).

Still additionally, in the harness setting screen D2 shown in FIG. 11, a configuration (cross-sectional shape, radius, width) of a harness and the number (number of divisions) thereof, which will be mentioned later, can be set arbitrarily, and an allowable minimum radius of curvature can be set.

Yet additionally, in the harness setting screen D2 shown in FIG. 11, for the setting (route calculation) of a harness, it is possible to set whether or not to reflect (consider) a physical characteristic (rigidity) of the harness or the gravity in the calculation of a harness route, and when the "consider" is selected in an item "rigidity/gravity", the above-mentioned first calculation mode is selected, and the harness position/configuration calculating unit 122 calculates a harness route reflecting the rigidity and the gravity.

Moreover, in this harness setting screen D2, after the input/selection to a predetermined item, the operator selects the "add transit point", thereby setting (adding) the end point (transit point).

Thereafter, the operator inserts an intermediate transit point into the harness route (temporary setting of an intermediate transit point; step B40).

Figure 12:
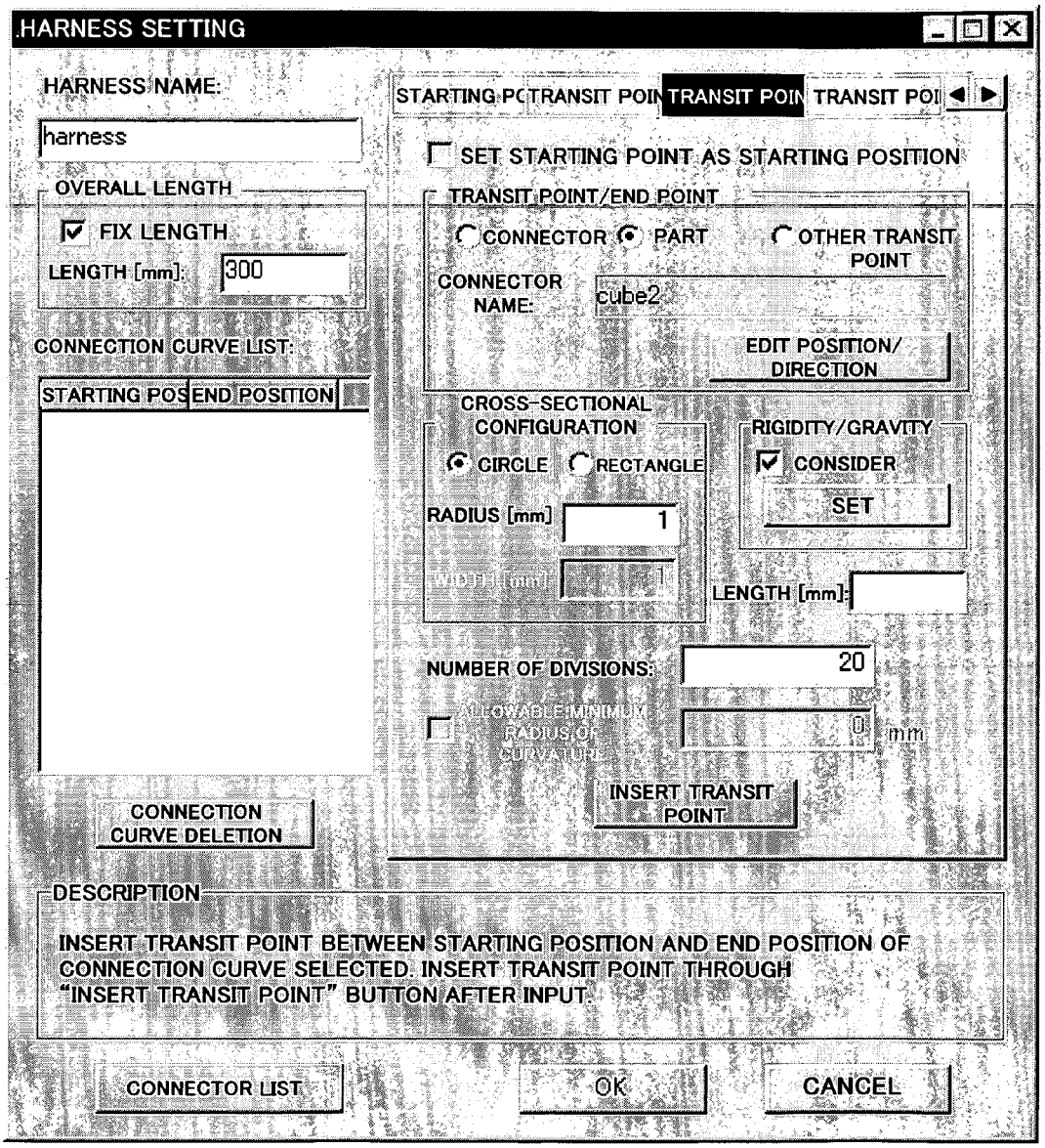
Figure 13:
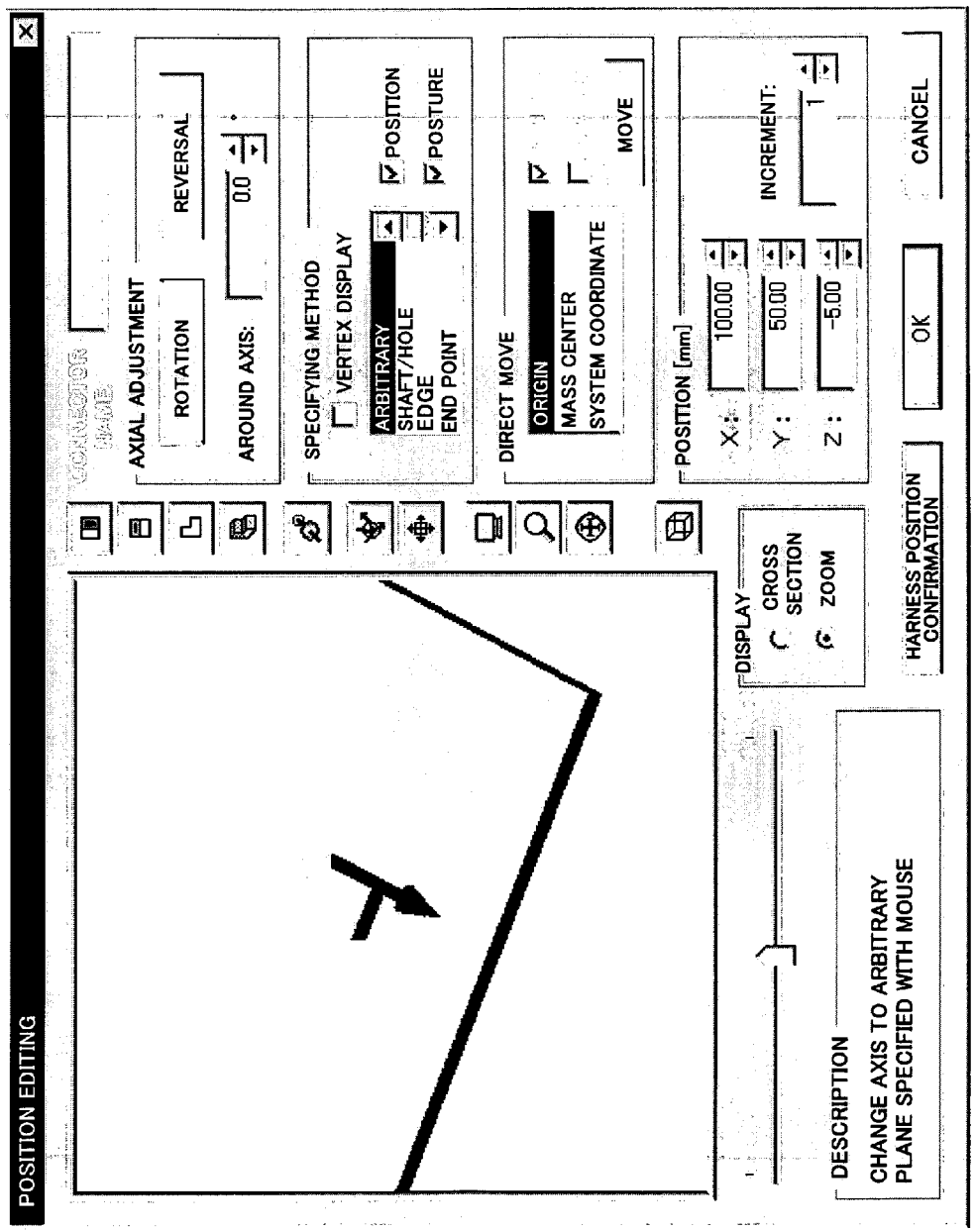

FIGS. 12 and 13 are illustrations of examples of display screens D3 and D4 to be put on the display 30 in a harness design supporting apparatus according to an embodiment of the present invention. FIG. 12 is an illustration of an example of a transit point adding screen (display screen D3) for adding (setting) a transit point (transit position) of a harness as the harness information 23, and FIG. 13 is an illustration of an example of a transit point setting screen (display screen D4) therefor. FIGS. 12 and 13 show an example in which a point on the part cube2 is set as a transit point between the connector c1 and the connector c2.

Also in the display screen D3 shown in FIG. 12, a transit point of a harness is set through the use of a connector, a part or another transit point, and FIG. 12 shows an example of setting a transit point through the use of the part cube2. For example, the operator selects the part cube2 through the mouse 41 or the like from the three-dimensional model data (not shown) of an object of design displayed as a different window together with the display screen D3 on the display 30, thereby selecting the "part name" cube2 as a transit point.

Moreover, in the display screen D3 shown in FIG. 12, after the selection of the part as a transit point, when the operator selects the "position/direction editing", the transit point setting (position editing) screen D4 shown in FIG. 13 appears on the display 30. In this transit point setting screen D4, the operator can set the position (transit position) of a transit point of the harness and the direction/posture (posture information) thereof in detail.

In the example shown in FIG. 13, a transit point of a harness and the information (arrow or the like) indicative of the direction/posture thereof are displayed together with the part cube2 and, in the transit point setting screen D4, the operator arbitrarily edits/sets a position of a harness and a posture thereof through the use of the mouse 41 or the like and then selects the "OK" to determine the transit point of the harness and the posture thereof.

Still moreover, when the operator selects the "harness position confirmation" in the transit point setting screen D4 shown in FIG. 13, for example, an image of the harness is displayed instead of the aforesaid transit point of the harness and the aforesaid information (arrow or the like) indicative of the direction/posture thereof, so the operator can confirm the position of the harness with respect to the part cube2.

Yet moreover, a decision is made as to whether or not the addition of the intermediate transit point comes to an end (step B50) and, in the case of the further addition of an intermediate transit point (see NO route of step B50), the operational flow returns to the step B40, and in the case of no addition of an intermediate transit point (see YES route of step B50), the harness position/configuration calculating unit 122 calculates the position of the harness and the configuration (harness route) thereof to produce a three-dimensional image of the entire harness and put it on the display 30 (step B60).

Furthermore, the curvature calculating unit 205 calculates a curvature (radius of curvature) of the harness and puts the calculation result on the display 30 for making the display to the operator (step B70), and the operator or the verification unit 14 makes a decision as to whether or not the radius of curvature is within an allowable range, that is, whether or not it exceeds a minimum radius of curvature set in advance (step B80).

If the curvature of the harness is within the allowable range (see YES route of step B80), the verification unit 14 then performs a check on the interference between the harness and a component constituting the design object apparatus and displays this result on the display 30 (step B90). The operator makes a decision as to whether or not there is a portion at which interference occurs in the harness route (step B100). In the case of no occurrence of interference (see NO route of step B100), the processing comes to an end.

Moreover, if there is a portion where the interference occurs in the harness route (see YES route of step B100), the operator or the transit position setting unit 204 corrects the harness route for removing the interference portion by adding an intermediate transit point on the harness route or in a manner such that the operator moves the transit point (starting point, endpoint, intermediate transit point) (step B110).

On the other hand, if the curvature of the harness is out of the allowable range (see NO route of step B80), the operational flow advances directly to the step B110.

In addition, the operator corrects the overall length of the harness as needed (step B120) and changes the length of a specified zone (between transit points) of the harness (step B130), and the operational flow then returns to the step B60.

The sequence of the above-mentioned processing in the steps B60 to B130 is not limited to the above-described example, but it is intended to cover all changes and modifications of the embodiments of the invention herein which do not constitute departures from the spirit and scope of the invention.

Figure 14:
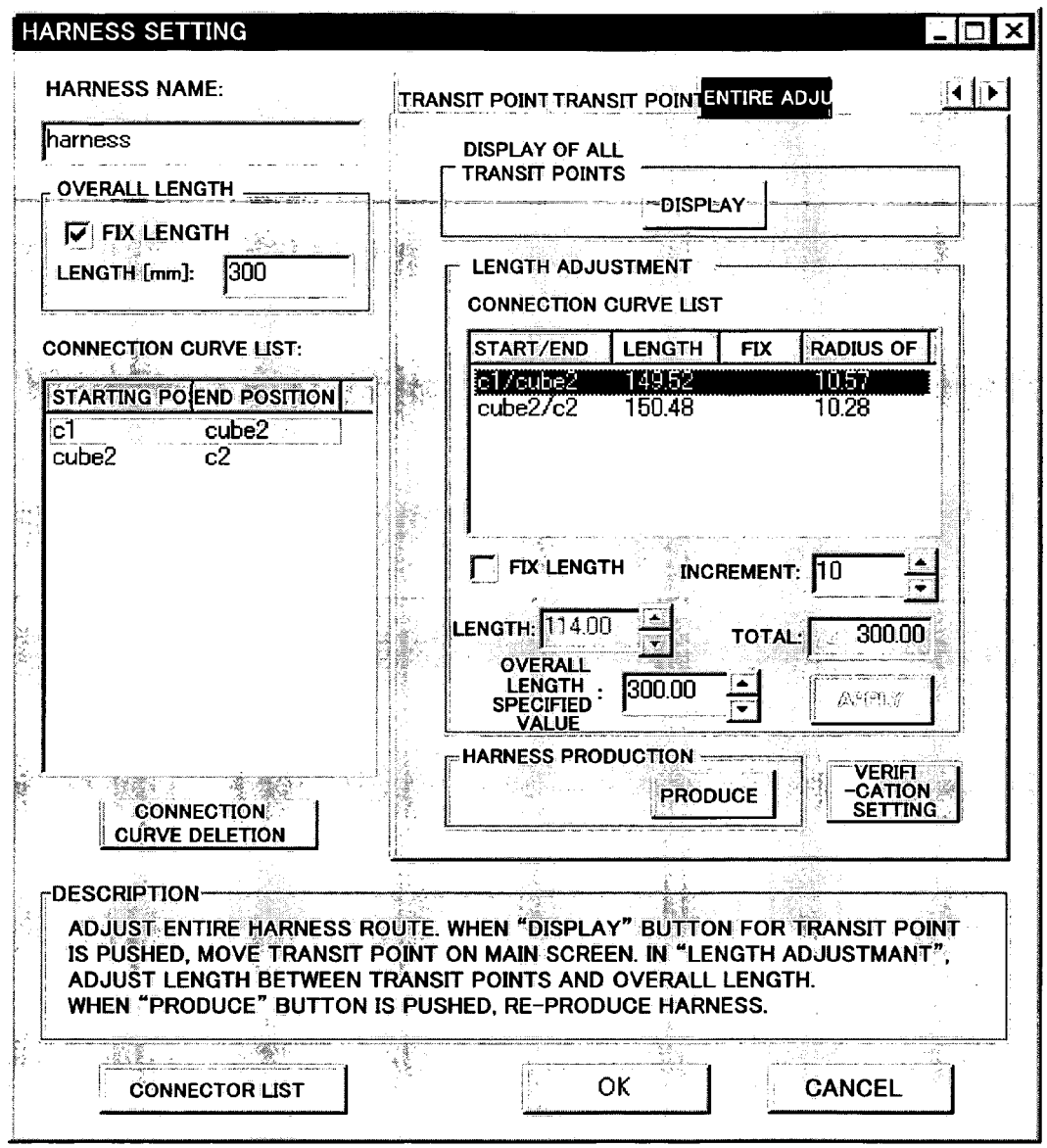
Figure 15:
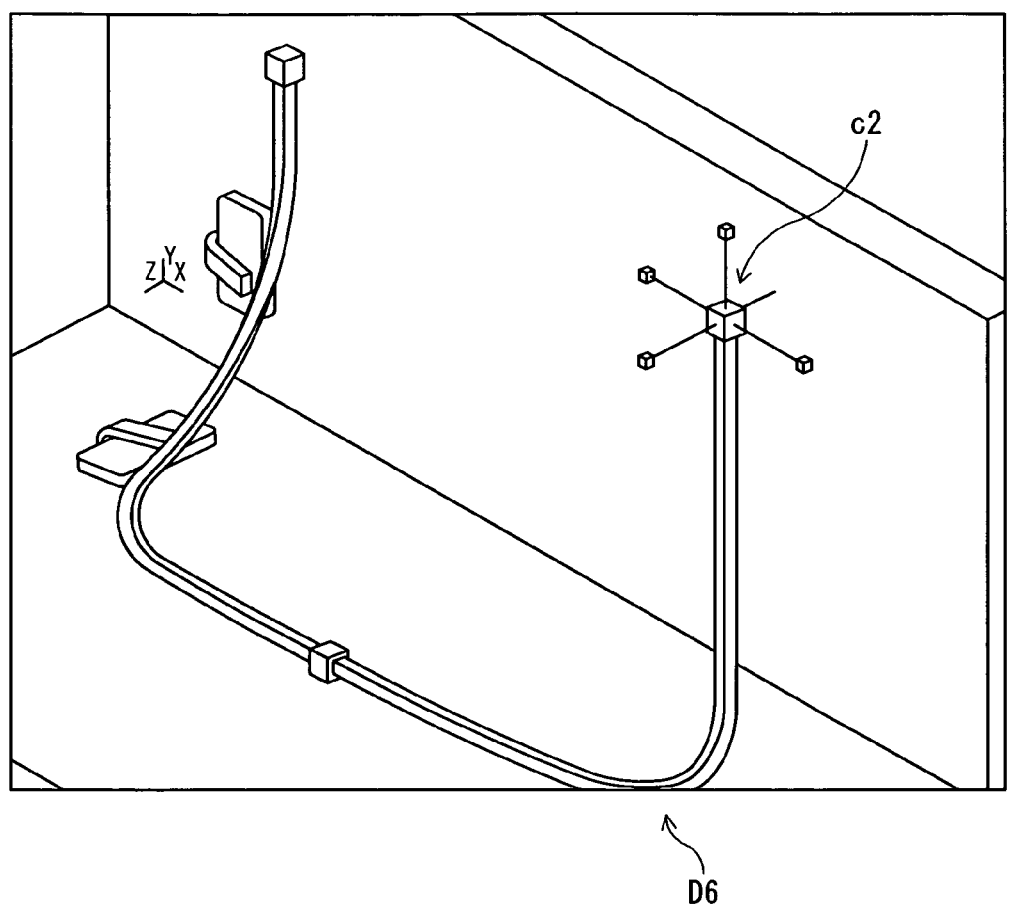
Figure 16:
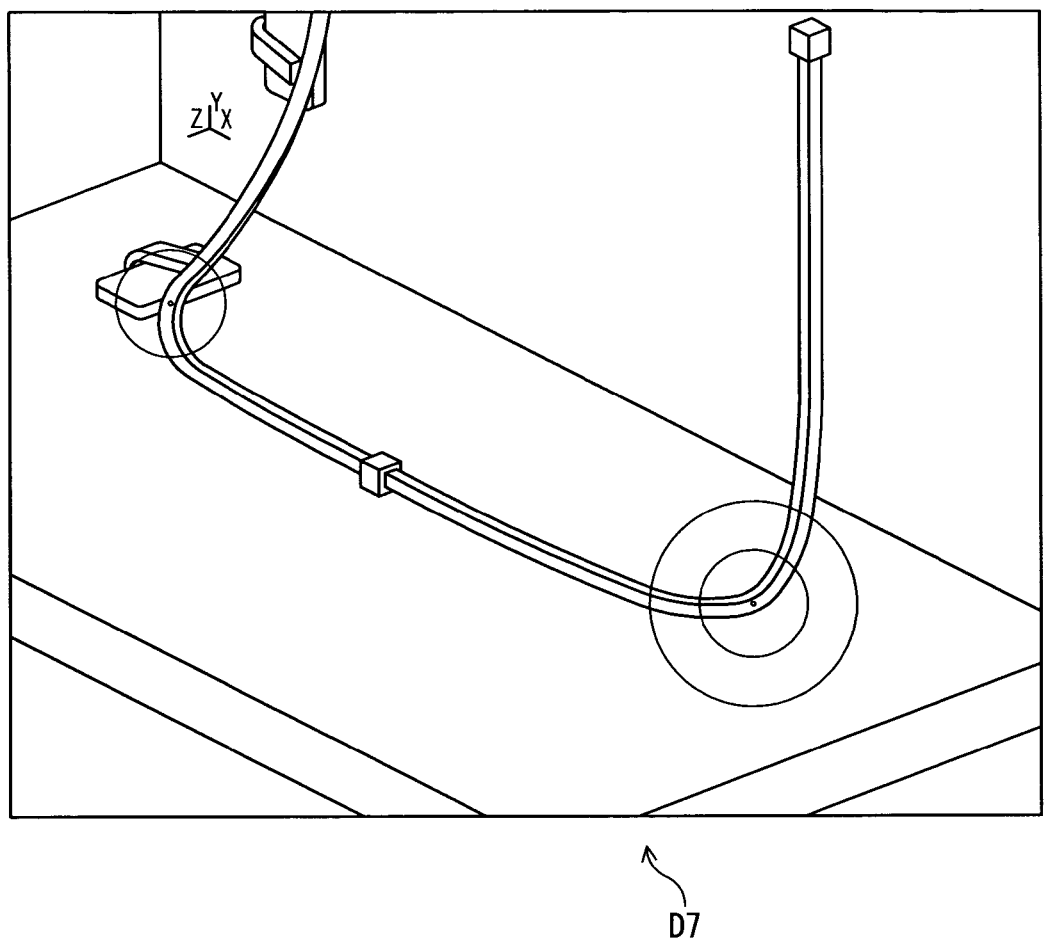

Referring to FIGS. 14 to 16, a description will be given hereinbelow of an example of the processing in the aforesaid steps B60 to B130. Each of FIGS. 14 to 16 is an illustration of an example of a display screen to be put on a display in a harness design supporting apparatus according to an embodiment of the present invention. FIG. 14 shows an example of a display screen D5 to be put on the display 30 in a harness design supporting apparatus according to an embodiment of the present invention and is an illustration of an example of an entire adjustment screen for carrying out the adjustment on the length of the harness, and FIG. 15 is an illustration of a display screen D6 for carrying out the transit point position adjustment, and FIG. 6 is an illustration of an example of a display screen D7 for displaying a result of verification on the harness route.

In this apparatus, on the basis of the harness information 23 inputted to the display screens D1 to D4, the harness position/configuration calculating unit 122 calculates the position/configuration of the harness, and the operator carries out the adjustment on the length of the harness in the display screen D5 shown in FIG. 14.

On the basis of the aforesaid harness information 23 inputted to the display screens D1 to D4, the harness position/configuration calculating unit 122 calculates the length of the harness (connection curve) between the respective transit points (starting point, transit point and end point) and the radius of curvature (minimum radius of curvature), with these calculation results being displayed as an item "connection curve list".

When needed, the operator lengthens the harness length of a predetermined zone or varies the overall length of the harness on the basis of the length of the harness and the radius of curvature displayed in the display screen D5.

In the display screen D5, the "length" is for setting the harness length in the case of fixing the harness length of a predetermined zone (between transit points), and the "overall length specifying value" is for specifying (varying) the overall length of the harness. The operator can set desired values as these "length" and "overall length specifying value" through the use of, for example, a spin box. Incidentally, the "increment" is for setting an interval of values to be displayed in each spin box for the "length" and the "overall length specifying value", and the overall length of the harness is expressed as "total".

In addition, when the operator selects the "display" (display of all transit points), the three-dimensional model image D6 of a harness shown in FIG. 15 is put on the display 30. In the three-dimensional model image D6 of a harness shown in FIG. 15, the harness is displayed together with the transit points (starting point, intermediate transit point, end point), and these transit points are displayed as a rectangular parallelepiped.

Still additionally, as shown in FIG. 15, the transit points (starting point, end point; connector c2 in the example shown in FIG. 15) the operator selects (makes active) through the use of the mouse 41 or the like are displayed such that a projection for position/direction adjustment protrudes vertically from a middle point of each of surfaces constituting the rectangular parallelepiped. The operator can move/edit the transit points by, for example, moving these projections through the use of the mouse 41.

In the display screen D5, the "verification setting" is for putting, on the display 30, a screen (not shown) for setting whether or not a verification is made by the verification unit 14 of this apparatus and, when the operator selects this "verification setting", various types of setting can be made with respect to, for example, whether or not to check the interference between the harness (that is, harness parts constituting the harness) and parts data (three-dimensional model data 22 of components) on a three-dimensional simulator, whether or not to check a portion where the radius of curvature becomes smaller than an allowable minimum radius of curvature on a harness route, and whether or not to display the information indicative of the maximum curvature position (position at which the radius of curvature is at a minimum) on the harness route (not shown).

For example, by making the setting to the effect of the display of a portion where the radius of curvature becomes below the allowable minimum radius of curvature on the harness route, when the "production" is selected in the display screen D5 shown in FIG. 14, in addition to the display of the three-dimensional model of the harness, as shown in FIG. 16, some mark (circle mark in the example shown in FIG. 16) is given to the portion below the allowable minimum radius of curvature on the harness route.

Yet additionally, in the display screen D5 shown in FIG. 14, when the operator selects the "production" (production of a harness), the harness position/configuration calculating unit 122 re-calculates a harness route on the basis of the harness length and the transit point position after changed and the direction/posture thereof, with the three-dimensional model image D7 of the harness shown in FIG. 16 being put on the display 30.

In terms of the example of the three-dimensional model image D7 of the harness shown in FIG. 16, the setting to the effect of the indication of a portion below the allowable minimum radius of curvature on the harness route is made in the aforesaid "verification setting (see FIG. 14)".

[2-2] About Simulation Function

Furthermore, referring to FIGS. 17 to 20, a description will be given hereinbelow of a simulation function on an operation of a facility element in the harness design supporting apparatus 1 according to this embodiment.

In this embodiment, a combination of the three-dimensional facility simulator technology and the harness modeling technology solves the problems in the dynamic verification and processing volume reduction in the harness design.

The three-dimensional facility simulator technology is a technique applied to the simulation unit 12 in this embodiment and is a simulation technique for regenerating an operation of a facility in a three-dimensional model. When a three-dimensional model is designed while simulating a three-dimensional model of a harness in the simulation unit (simulator) 12, the verification on an operation of the harness becomes feasible.

Moreover, in the harness modeling technology, there is a need to deform a three-dimensional model of a harness in real time. For accomplishing the deformation simulation at a high speed, a harness is modeled with a structure in which a large number of small parts (harness parts) are connected to each other, as mentioned later with reference to FIGS. 17 and 5. At this time, the connection between the adjacent small parts is made with a rotary joint having three-degree-of-freedom.

Furthermore, for an operation of a three-dimensional model of this harness being linked with an operation of a facility element, in this embodiment, as mentioned above with reference to FIG. 5, the position of the entire harness and the configuration thereof are determined by the transit points (the starting point and the end point). That is, when the starting point or the end point is coupled to a facility element, the starting point or the end point also moves along with the movement of the facility element and the harness deforms accordingly. This deformed configuration is approximated with the Bezier curve and the joint angle of the connection section (rotary joint) between the small parts is adjusted so as to fit into the Bezier curve.

Prior to the start of the operation of the harness design supporting apparatus 1 according to this embodiment, the design of a facility element other than the harness is previously made in the three-dimensional CAD unit 60 as mentioned above. Moreover, the three-dimensional model data designed by this three-dimensional CAD unit 60 is converted into polygon data having a smaller volume and then inputted as the three-dimensional model data 22 to the memory 20.

This three-dimensional model data 22 includes, in addition to the configuration data on each facility element, position/configuration information, information on the relationship with other parts, and others.

The CPU 10 reads this three-dimensional model data 22 to put a three-dimensional model (three-dimensional image) on the display 30 through the functions of the three-dimensional image producing unit 123 and the display control unit 13. Moreover, the definition of a joint and a facility in the three-dimensional model, the modeling of the harness and the manipulation of the facility are made through the use of the user-side inputting unit such as the mouse 41 and the keyboard 40. Incidentally, the input/display of the three-dimensional model and the definition/manipulation of the facility can be made using the function (three-dimensional facility simulation technology) of the existing three-dimensional facility simulator, and the description thereof will be omitted for brevity. A detailed description will be given hereinbelow of the harness modeling technique, the verification method and others.

[2-2-1] About Multiple Connected Structure of Harness Model

Figure 17:
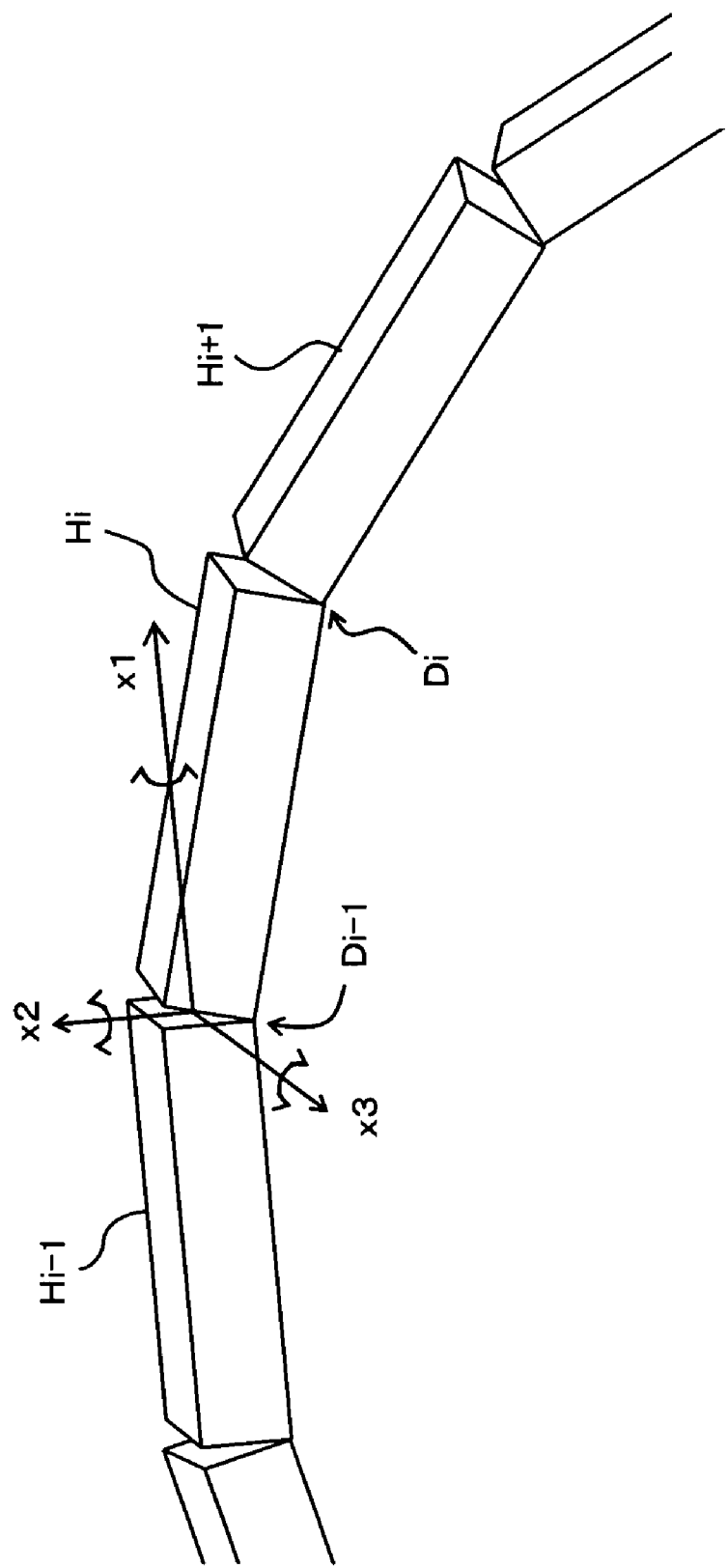
FIG. 17 is an illustration for explaining a harness modeling method according to this embodiment.

FIGS. 17 and 5 are illustrations for explaining a harness modeling method according to this embodiment.

As shown in FIGS. 17 and 5, in this embodiment, the harness model is constructed by connecting a large number of small parts (harness parts) H1 to HN each having a simple configuration such as rectangular parallelepiped or column.

Moreover, as shown in FIG. 17, the connection portion (harness division point position) Di-1 between the harness parts Hi-1 and Hi is made as a rotary joint having three-degree-of-freedom, and the harness parts Hi-1 and Hi are connected through the rotary joint to each other, thus constructing the harness model. For example, as shown in FIG. 17, the three-degree-of-freedom rotary axes of the harness part Hi relative to the harness part Hi-1 are a longitudinal central axis x1 of the harness part Hi-1, an axis x2 perpendicular to this axis x1 and an upper surface of the harness part Hi-1 and an axis x3 perpendicular to the axes x1 and x2.

Thus, the harness is handled as a model made by making the connection between the harness parts Hi-1 and Hi through the rotary joint with the three-degree-of-freedom, and this harness model can express bending and torsion in arbitrary directions.

Incidentally, the number of divisions of the harness (number of harness parts) can be a value set as a default, or it can also be a value set as, for example, the harness information 23.

[2-2-2] Manipulation of Harness Configuration

A change of the harness configuration (curve C) can easily be made by changing the position/posture of the starting point or the end point. That is, when the starting point or end point of the harness is coupled with a facility element (in this embodiment, a connector part), the position/posture of the starting point or the end point varies in connection with the facility element and the harness configuration (curve C) varies accordingly.

In this embodiment, as mentioned above, a position of a facility element is calculated on a predetermined cycle in the facility element position calculating unit 121, and the starting point position of the harness and the end point position thereof, which interface with an operation of the facility element, are determined in accordance with the position of the facility element calculated therein. Moreover, on the basis of the determined starting point position and end point position, the harness position/configuration calculating unit 122 calculates the harness configuration (curve C) through the approximation using the Bezier curve on the predetermined cycle.

In addition, the designer can change the harness configuration appearing on the display 30 by specifying/changing the harness length (overall length) L through the keyboard 40 and the mouse 41 while seeing the display 30, and can see the harness configuration corresponding to the length L on the display 30.

Still additionally, the designer can also change the harness configuration appearing on the display 30 by moving one point of the three-dimensional image of the harness appearing on the display 30 through the drag manipulation of the mouse 41. The Bezier curve can be divided at an arbitrary position to be converted into two Bezier curves. Therefore, when the Bezier curve C approximating the harness configuration is divided at a point on the harness (curve C) specified through the mouse 41 to newly calculate two Bezier curves in a state where the specified point is set as the starting point of the new Bezier curve and the end point thereof, the curve configuration (i.e., the harness configuration) is changed and the designer can see the changed harness configuration on the display 30.

However, in the case of the division of the Bezier curve C, the Bezier curve C is divided whenever a point on the Bezier curve C is specified, which increases the number of divisions so that there is a possibility of suffering complicated processing. For this reason, it is also appropriate that, by manipulating the positions of P2 and P3, the configuration of the Bezier curve C is changed so that the Bezier curve C passes through the specified point.

[2-2-3] Specification of Cross-sectional Configuration

In this embodiment, by defining a cross-sectional configuration A of a harness included in the harness information 23, it is possible to change the size of the harness which is an object of modeling and further to make the modeling corresponding to a flat cable (see an item "cross-sectional configuration" in FIGS. 11 and 12). Moreover, when the definition of the cross-sectional configuration A is managed for each harness part, it is also possible to make the modeling supporting a case in which, for example, a harness is halfway coupled with another harness so that the thickness thereof varies.

[2-2-4] Handling as One Part

In the case of the modeling of a harness as a structure in which a large number of small parts (harness parts) are connected to each other, if the number of harnesses in an apparatus which is an object of design increases, the number of parts becomes considerably large and, hence, the load of the arithmetic operation becomes extremely large. However, all the harnesses does not interface with an operation of a facility element and, since the harness having no interface with the operation of the facility element does not deform absolutely, the harness which has been handled as a plurality of harness parts is handled as one part after the position/configuration of the harness is determined at the beginning (at the initial setting). This handling as one part can reduce the number of parts and lessen the load of the arithmetic operations.

[2-2-5] Connection/Branch of Harness

Usually, a harness is disposed with complicated connection/branch being repeated. For modeling this, a plurality of harnesses are made to be connected to the starting point of the harness and the end point thereof.

[2-2-6] Interference Check

In this embodiment, the small parts (harness parts) constituting a harness can be managed in the same data mode as the part data (three-dimensional mode data 22 of a facility element) on a three-dimensional facility simulator. Therefore, when an interference check function (verification unit 14) is incorporated into the three-dimensional facility simulator (CPU 10), the interference between a facility element and a harness can be checked on a three-dimensional model. This enables the verification on, for example, whether or not to sufficiently secure a space for the harness. Moreover, when the interference check is made by the verification unit 14 while moving the facility, it is possible to dynamically verify the entangling or trapping of the harness.

[2-2-7] Verification on Length

For varying the harness configuration while moving the facility, as mentioned above, the configuration is calculated so that the length of the harness (curve C) is made constant (for example, specified length L). That is, the positions of P2 and P3 are determined every time in accordance with the variation of the position of the starting point P1 or the end point P4 so that the length of the curve C becomes the specified length L.

However, in a case in which difficulty is encountered in making the connection between the starting point P1 and the end point P4 in the harness with the specified length L because the starting point P1 and the end point P4 become too remote from each other along with the movement of the facility, it is naturally impossible to determine P2 and P3. This situation is detected by the verification unit 14 and this fact is put on, for example, the display 30 to notify the lack of the length of the harness to the user (designer), thereby carrying out the dynamic verification on the length of the harness.

[2-2-8] Two-Dimensional Layout View Expansion

After a harness is designed on a three-dimensional model, for the production of the harness, there is a need to expand the three-dimensional model of the harness, obtained as a result of the simulation by the simulation unit 12, on a two-dimensional view. At this time, usually, for two-dimensionally expanding the harness in a complicatedly branched/coupled state, there is a need to make the trial and error.

In this embodiment, a branch point of the harness is considered as a node of a graph and a method of expanding the three-dimensional graph disposition into a two-dimensional plane (for example, see Jun Nagumo, Jiro Tanaka: "viewPP: Visualization of Implementation of Program Based on Graph Structure and Animation Expression", Japanese Software Society 14th Collection of Meeting Articles, 1997, September, pp. 17-20) is employed, and the three-dimensional model of a harness is automatically expanded into a two-dimensional layout view of the harness, thereby creating and outputting the two-dimensional view.

[2-2-9] Management of Signal Information

In this embodiment, information such as connector, clamp, coat signal line and From To list are inputted as attribute data (attribute information) of a harness and, when needed, the attribute data is displayed together with a three-dimensional image of the harness on the display 30. Thus, the designer can confirm the specification of the harness while seeing the three-dimensional model on the display 30.

In addition, the From To list (wiring information on signals) and the three-dimensional model are displayed on the display 30 in corresponding relation, and the designer can confirm the position with which a signal passes on the three-dimensional model. Thus, the designer can confirm the distance between a noise source such as a power supply line and a signal line, and others. Incidentally, it is also appropriate that it has a function to automatically calculate and display the shortest distance between the noise source and the signal line.

Still additionally, the aforesaid attribute data can include a physical attribute (density or the like) of the harness. In this case, it is possible to automatically calculate the overall length of the harness, the weight thereof and others.

[2-2-10] Library

Since the starting point of a harness model and the end point thereof are points which can become a transit point of the harness or a relay point thereof, they are frequently set on a connector part or a clamp part. Therefore, when a connector part/clamp part defined in connection position/posture and fixing position/posture of the harness is previously preserved in the form of a library in the external storage unit 70 or the like, the designer can specify the starting point position of the harness, the endpoint position thereof and the postures at the respective positions by only selecting the parts (connector parts or clamp parts) at the starting point/end point of the harness and disposing them on the three-dimensional model through the use of the keyboard 40 or the mouse 41.

Figure 18:
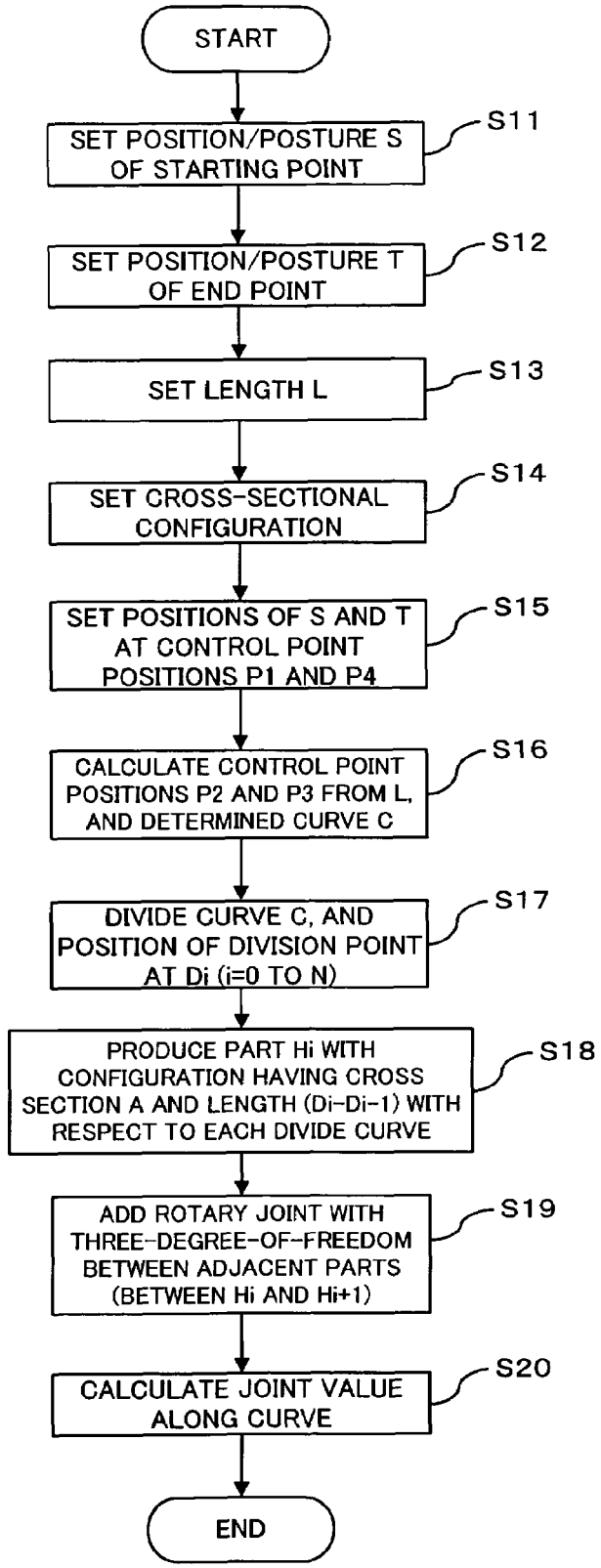
FIG. 18 is a flow chart for explaining a harness modeling procedure (initial setting procedure) according to this embodiment.
Figure 19:
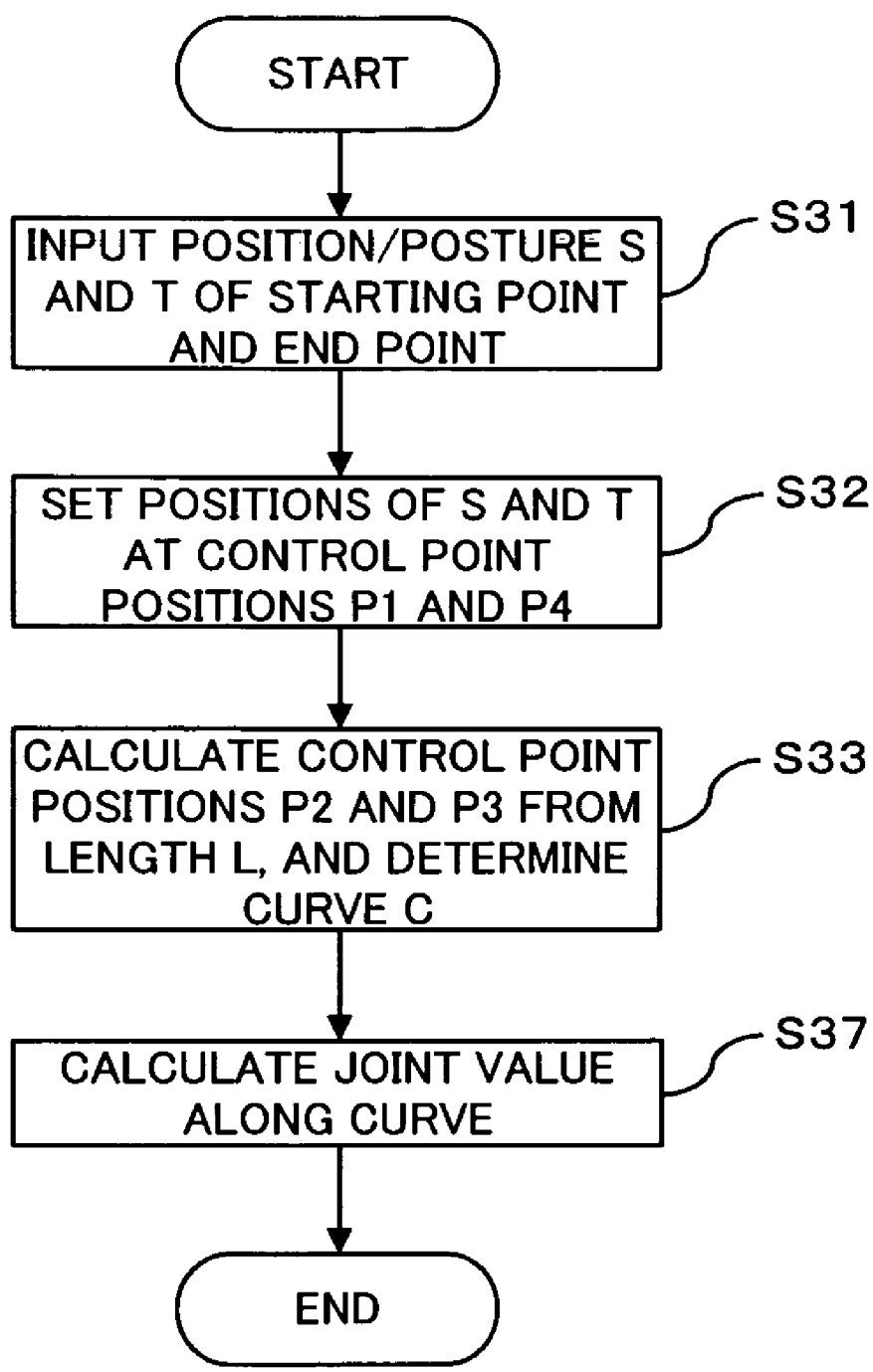
FIG. 19 is a flow chart for explaining a harness modeling procedure (procedure for dynamically deforming a harness position/configuration) according to this embodiment.
Figure 20:
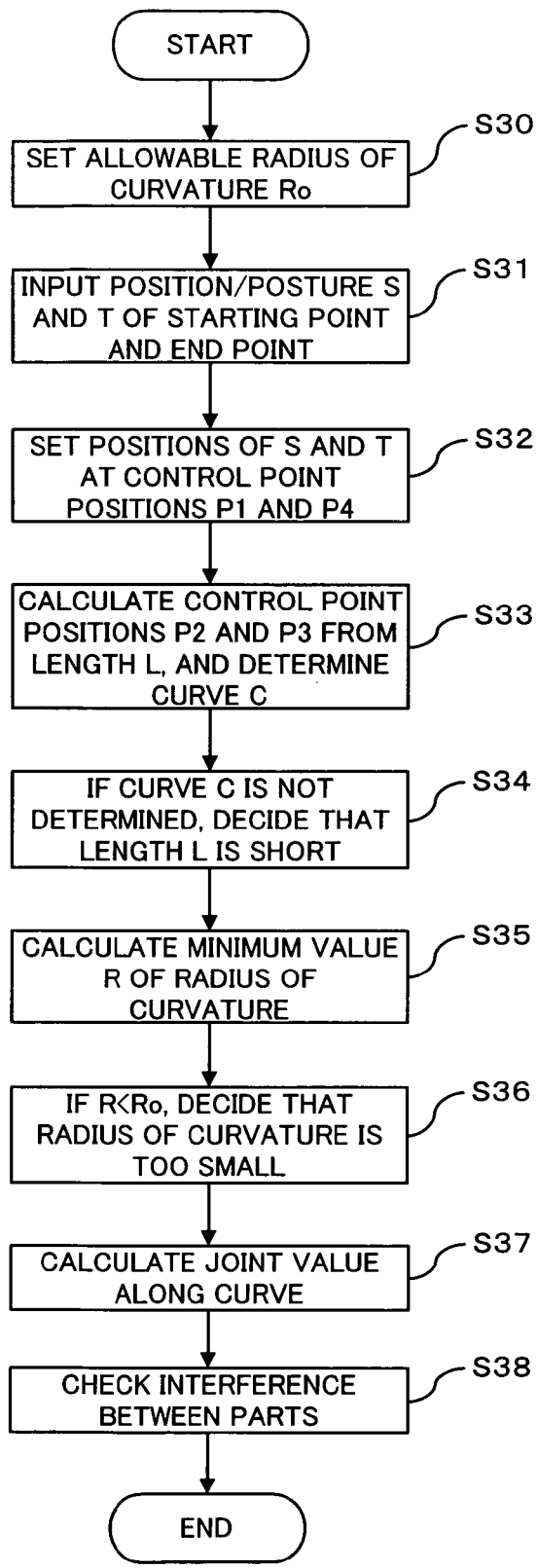
FIG. 20 is a flow chart for explaining a processing procedure to be conducted when a dynamic verification on a harness is made simultaneously with a harness modeling (dynamic deformation) in this embodiment.

[2-2-11] About Operation of Harness Design Supporting Apparatus According to This Embodiment Furthermore, referring to the flow charts of FIGS. 18 to 20, a description will be given hereinbelow of an operation of the harness design supporting apparatus 1 according to this embodiment.

First of all, a harness modeling procedure at the initial setting according to this embodiment will be described with reference to the flow chart (steps S11 to S20) of FIG. 18.

In the modeling of a harness to be conducted at the starting of the harness design, first, the position/posture data S on the starting point of the harness, the position/posture data T on the end point of the harness, the length L of the harness and the cross-sectional configuration A of the harness are set as the harness information 23 (steps S11 to S14). The harness information 23 can be inputted in a manner such that a designer manipulates the keyboard 40 or the mouse 41, or the information previously recorded in a medium such as a flexible disk can also be inputted through a driver.

Moreover, as mentioned above with reference to FIG. 5, the positions of S and Tare set at the control point positions P1 and P4, respectively (step S15), and the positions of P2 and P3 on the directional vectors S and T are then determined on the basis of the specified length L to determine a configuration of the curve C (step S16).

Following this, the determined curve C is divided into divided portions (divided curves) which are N in number, and the positions of the division points are set at Di (i=0 to N) (step S17). However, the positions D0 and DN of the division points are positions corresponding to the starting point position of the harness and the end point position thereof, respectively.

A part (harness part) Hi (i=1 to N) having the cross-sectional configuration A and the length (Di–Di–1) is produced with respect to each divided curve (step S18), and a rotary joint with the three-degree-of-freedom, shown in FIG. 17, is added between the adjacent parts Hi and Hi+1 (step S19) and further a joint value of each rotary joint is calculated so that each part Hi follows the curve C (step S20). Thus, the modeling of the harness comes to an end.

Secondly, referring to the flow chart (steps S31 to S33, S37) of FIG. 19, a description will be given hereinbelow of a dynamic deformation procedure (harness modeling procedure) on the harness position/configuration according to this embodiment. In this case, the dynamic verification on the harness in the verification unit 14 is not conducted.

After the initial setting of the harness model according to the procedure described with reference to FIG. 18 reaches completion, the position of a facility element is calculated on a predetermined cycle and, when the positions of the starting point of the harness and the end point thereof vary along with the variation of the position of this facility element, the processing is conducted according to the procedure shown in FIG. 19.

That is, when the positions/postures S and T of the new starting point and end point of the harness are inputted according to the variation of the position of the facility element (step S31), the new S and T positions are set at the control point positions P1 and P4 (step S32) and the positions of P2 and P3 on the directional vectors S and T are then determined on the basis of the specified length L to determine the configuration of the curve C (step S33). Subsequently, the joint value of each rotary joint is calculated so that each part (harness part) Hi produced in the step S18 of FIG. 18 follows the curve C determined in the step S33 (step S37). Thus, the dynamic modeling of the harness comes to an end.

Lastly, referring to the flow chart (steps S30 to S38), a description will be given hereinbelow of a processing procedure to be conducted when the dynamic verification is made simultaneously with the modeling (dynamic deformation) of a harness in this embodiment. In this case, the dynamic verification procedure (steps S30, S34 to S36, S38) on the harness in the verification unit 14 is added to the dynamic deformation procedure (steps S31 to S33, S37) described above with reference to FIG. 19.

For the verification on a curvature, an allowable radius of curvature Ro of the harness which is an object of modeling is set in advance (step S30) and, as well as the abovementioned case, when the positions/postures S and T of the new starting point of the harness and the new end point thereof are inputted in accordance with the variation of the position of the facility element (step S31), the new S and T positions are set as the control point positions P1 and P4, respectively, (step S32) and the positions of P2 and P3 on the directional vectors S and T are determined on the basis of the specified length L to determine the configuration of the curve C (step S33).

At this time, if the configuration of the curve C cannot be determined in the step S33, a decision is made that the specified length L of the harness is too short, and this fact is notified through the display 30 or the like to the designer (step S34).

Moreover, if the configuration of the curve C cannot be determined in the step S33, the minimum value R of the radius of curvature of the curve C is calculated (step S35) and, when the minimum value R is smaller than the allowable radius of curvature Ro, a decision is made that the radius of curvature of the curve C is too small, this fact is notified through the display 30 or the like to the designer (step S36).

If the minimum value R exceeds the allowable radius of curvature Ro, the joint value of each rotary joint is calculated so that each part (harness part) Hi follows the curve C determined in the step S33 (step S37), and the inter-part interference check (check on the interference situation between the harness part and the facility element) is made and, if the interference occurs, this fact is notified through the display 30 or the like to the designer (step S38). The dynamic modeling and the dynamic verification on the harness then come to an end.

[3] About Effects of Harness Design Supporting Apparatus According to This Embodiment The effects of the foregoing harness design supporting apparatus 1 according to this embodiment are collectively described hereinbelow.

[3-1] The information on a physical characteristic (for example, rigidity) of a harness is set as the characteristic information 206 in the characteristic information setting unit 202 and a three-dimensional model on each of the harness and a component is constructed on the basis of the harness information set in the harness information setting unit 11, the three-dimensional model data 22 on the component and the characteristic information 206 set in the characteristic information setting unit 202. This enables a harness route to be designed so as to commensurate with the physical characteristic (for example, rigidity) of the harness, which improves the harness design quality and realizes the enhancement of efficiency of the harness design.

In addition, the harness position/configuration calculating unit 122 obtains a curve configuration so that the potential energy U of the harness reaches a minimum, thereby calculating the position/configuration of the harness. This enables the harness configuration to be calculated in a shorter time in comparison with the analysis using a finite-element method. Moreover, This enables easily carrying out the harness design reflecting the physical characteristic of the harness, which improves the design quality and provides the convenience.

[3-2] The mode selecting unit 201 can select a first calculation mode of calculating a position of the harness and a configuration thereof through the approximation using the Bezier curve on the basis of one or more transit positions of the harness and the information on a posture at the transit position, included in the harness information 23, and the characteristic information 206 set in the characteristic information setting unit 202 and a second calculation mode of calculating a position of the harness and a configuration thereof through the approximation using the Bezier curve on the basis of one or more transit positions of the harness and the information on a posture at the transit position, included in the harness information 23. Thus, an operator can select a desired calculation mode in accordance with the performance of the computer 1 or the like, which provides high convenience.

[3-3] In a case in which a verification is made that the component and the harness interfere with each other, the transit position setting unit 204 sets the transit position so that the harness is positioned in parallel with a surface of the component at a position of the interference. This can easily eliminate the interference occurring between the harness and the component, which improves the harness design quality and provides high convenience.

[3-4] In a case in which a verification is made that the component and the harness interfere with each other, the display control unit 13 displays the information indicative of the interference position on the display 30. This enables an operator (designer) to easily find the interference occurring between the harness and the component. Thus, for example, the operator can correct the harness route so that the interference does not occur, which prevents the occurrence of the interference, improves the harness design quality and provides high convenience.

[3-5] The transit position changing unit 203 can change the transit position of the harness and the posture information thereon and the harness position/configuration calculating unit 122 calculates the harness position and configuration on the basis of the changed harness transit position and the changed posture information. This provides high convenience.

In particular, the harness position/configuration calculating unit 122 calculates the harness position and configuration by proportionally distributing the difference between the sum total of the shortest distances between the transit positions on a passage route of the harness and the overall length of the harness among the respective transit positions on the basis of the harness transit position and the posture information changed by the transit position changing unit 203 and the harness transit position and the posture information included in the harness information 23. Therefore, even in the case of moving/changing an intermediate transit point in a state where the overall length of the harness is fixed, it is possible to carry out the design of the harness route in a short time.

Moreover, the harness position/configuration calculating unit 122 calculates the harness position and configuration immediately after the transit position and the posture information are changed by the transit position changing unit 204. Therefore, in a case in which, at the design of the harness route, the position of a transit point is changed when a harness route which is free from a problem in curvature and interference is determined while making fine adjustment on the position of the harness transit point, an operator can immediately confirm the harness route reflecting the change, which provides high convenience.

Still moreover, after the transit positions of a plurality of harnesses and posture information are changed by the transit position changing unit 203, the harness position/configuration calculating unit 122 calculates the harness position and configuration on the basis of the transit positions of the plurality of harnesses and the posture information after changed by the transit position changing unit 203. Thus, for example, even in a case in which a computer system does not have a high performance, after an operator changes (moves) the positions of a plurality of transit points, the harness position/configuration calculating unit 122 collectively calculates a harness route with respect to the plurality of moved transit points, which enables the interactive adjustment of the harness route.

Yet moreover, in a case in which the harness transit position and the posture information are changed by the transit position changing unit 203, the harness position/configuration calculating unit 122 calculates the harness position and configuration through the use of the information on the harness position and configuration before changed. This enables a convergence calculation to be done at a high speed for obtaining a route whereby the potential energy U of the harness reaches a minimum, which leads to the shortening of the design time and to high convenience.

[3-6] The curvature calculating unit 205 calculates a curvature of the harness and the display control unit 13 displays the information on the curvature of the harness on the display 30. This enables the operator (designer) to easily find the information on the curvature, which provides high convenience.

For example, when the information indicative of the position at which the curvature of the harness reaches a maximum is displayed on the display 30, the operator can easily know the position at which the curvature of the harness stands at a maximum value, which leads to high convenience.

In addition, in a case in which the value of the curvature of the harness exceeds a predetermined value, the information indicative of this fact is displayed on the display 30. Thus, the operator can find the position at which the curvature of the harness exceeds the predetermined value, which leads to high convenience.

[3-7] In a state interlocked with an operation of a facility element, the operation of the harness is simulated through the use of a three-dimensional facility model constructed on the basis of the harness information 23 and the three-dimensional model data 22 on the facility element, and the simulation results are displayed as the harness operation and the facility element operation on the display 30. Thus, the operator can confirm the movement of the harness connected to the facility operation at the harness design. This provides, to the designer, an environment capable of carrying out the dynamic verification on the harness design, which realizes the enhancement of efficiency of the harness design.

[3-8] Since the harness is handled as a three-dimensional model having a structure in which a large number of harness parts are mutually connected through the use of a rotary joint with three-degree-of-freedom as shown in FIG. 17 or 5, it is possible to handle the harness as a simple three-dimensional model. Therefore, the operation of the harness interlocked with the operation of the facility element can be simulated according to a simple method, and the operation of the harness can be simulated in real time without increasing the processing volume. Moreover, since the operation of the harness is displayed as a three-dimensional image in real time on the display 30, the designer can visually find the state of the operation of the harness in real time and three-dimensionally and can catch it reliably.

[3-9] The employment of the starting point position of the harness, the end point position thereof and the posture at each position included in the harness information 23 enables the easy calculation of the position or configuration of the harness and, in particular, by the approximation of the position or configuration of the harness using the Bezier curve, it is possible to obtain the position or configuration of the harness more easily and in a short time. Moreover, as shown in FIG. 5, since a plurality of harness parts constituting a three-dimensional model of the harness are connected to follow the obtained Bezier curve, which enables a three-dimensional image of the harness to be produced in an extremely easy fashion and in a short time.

[3-10] Since a cross-sectional configuration of the harness is set as the harness information 30 in the harness information setting unit 11 and a three-dimensional image of the harness is produced in accordance with the cross-sectional configuration of the harness included in the harness information 23 in the three-dimensional image producing unit 123, it is possible to arbitrarily specify the cross-sectional configuration of the harness which is an object of simulation and further to cope properly with harnesses different in thickness or a harness such as a flat cable. Moreover, if the cross-sectional configuration is set for each harness part, it is possible to cope with a case of coupling halfway to other harnesses so that the harness thickness or cross-sectional configuration varies.

[3-11] When the simulation unit 12 confirms that the harness is unrelated to the operation of a facility element and is a static part, instead of being handled as a large number of harness parts, the harness is handled as one part. With respect to the harness which is not interlocked with the operation of the facility element, i.e., a harness which does not deform fully irrespective of the operation of the facility element, there is no need to simulate the operation thereof and, hence, when it is handled as one part as mentioned above, there is no need to preserve the information on the large number of harness parts, which reduces the number of parts of an object of simulation, thus contributing to the effective utilization of the memory capacity and the speeding-up of the processing.

[3-12] The verification unit 14 is used to carry out the dynamic verification on the harness (for example, the interference between the harness and a facility element, the harness length, the verification on the curvature of the harness) at any time on the basis of a result of the simulation by the simulation unit 12, and the dynamic verification is implemented simultaneously with the implementation of the simulation and a designer can immediately carry out the verification on various types of troubles so that the harness design immediately reflects the verification result.

[3-13] The expansion unit 15 is used to convert/expand a three-dimensional model, obtained as the result of the simulation by the simulation unit 12, into a two-dimensional layout view, and there is no need for the designer to conduct the his/her own expansion of the three-dimensional model of the harness into the two-dimensional plan view but this two-dimensional plan view is automatically obtainable, which considerably improves the convenience to the designer.

[3-14] The attribute information on the harness is inputted to display this attribute information together with the image of the harness on the display 30, and the designer can recognize various types of information such as a signal to be transmitted through the harness and the range of the location of the harness while confirming the operation of the harness, which further improves the convenience to the designer.

[3-15] The library which preserves the information on a connector part/clamp part together with the information on the connection position/fixture position of the harness to the connector part/clamp part and on the posture at that position is previously produced in the external storage unit 70 or the like so that the designer can select the connector part/clamp part for the connection/fixture of the harness from the library to set the starting point or end point of the harness and the posture at that position as the harness information, which eliminates the need for the designer to input/set the starting point or end point of the harness and the posture at that position one by one and leads to extremely easy setting of the harness information.

[4] Others

The present invention is not limited to the above-described embodiments, and it is possible to cover all changes and modifications of the embodiments of the invention herein which do not constitute departures from the spirit and scope of the invention.

For example, although in the above-described embodiments the rigidity of a harness is used as the physical characteristic of the harness, the present invention is not limited to this, but it is also appropriate to use characteristics other than the rigidity.

INDUSTRIAL APPLICABILITY

As described above, according to the present invention, through the use of a three-dimensional facility model constructed on the basis of harness information and three-dimensional model data on a facility element, an operation of the harness is simulated in a state interlocked with an operation of the facility element, and the simulation result is put as the operation of the harness and the operation of the facility element on a display unit. Thus, at the harness design, a designer can confirm the operation of the harness along with the facility operation in real time without increasing the processing volume, and an environment capable of the dynamic verification on the harness design is furnished to the designer, thereby realizing the enhancement of efficiency of the harness design.

Therefore, the present invention is suitable for use in not only the design and development of equipment such as printer, vehicle, machine tool and industrial robot incorporating a harness such as cable or wire for signal or power supply but also the arrangement design of various types of members with flexibility and elasticity including piping, rubber hose and others and it is considered that its availability is extremely high.

What is claimed is:

1. A harness design supporting apparatus, made to support an arrangement design of a harness in an apparatus incorporating said harness which is an object of design, comprising:

a component information preserving unit for preserving three-dimensional model data on a component other than said harness in said design object apparatus;

a harness information setting unit for setting information on said harness as harness information;

a characteristic information setting unit for setting information on a physical characteristic of said harness as characteristic information;

a three-dimensional model constructing unit for constructing a three-dimensional model of each of said harness and said component on the basis of said harness information set in said harness information setting unit, said three-dimensional model data on said component in said component information preserving unit and said characteristic information set in said characteristic information setting unit; and a display control unit for displaying said three-dimensional model, constructed in said three-dimensional model constructing unit, on a display unit, wherein:

said three-dimensional model constructing unit includes:

a harness position/configuration calculating unit for calculating a position of said harness and a configuration thereof on the basis of a position of said component, said harness information set in said harness information setting unit and said characteristic information set in said characteristic information setting unit, and a three-dimensional image producing unit for producing a three-dimensional image of each of said component and said harness on the basis of said position of said harness and said configuration thereof, calculated in said harness position/configuration calculating unit, said harness information set in said harness information setting unit and said three-dimensional model data on said component, and further for outputting said three-dimensional image;

said display control unit is made to display said three-dimensional image from said three-dimensional image producing unit on said display unit;

said harness position/configuration calculating unit calculates said position of said harness and the configuration through approximation using a Bezier curve on the basis of one or more transit positions of said harness and information on a posture at each of said transit positions, included in said harness information, and said characteristic information set in said characteristic information setting unit.

2. The harness design supporting apparatus according to claim 1, further comprising a mode selecting unit for selecting one of a first calculation mode of calculating said position of said harness and said configuration thereof through approximation using a Bezier curve on the basis of one or more transit positions of said harness and information on a posture at each of said transit positions, included in said harness information, and said characteristic information set in said characteristic information setting unit and a second calculation mode of calculating said position of said harness and said configuration thereof through approximation using a Bezier curve on the basis of one or more transit positions of said harness and information on a posture at each of said transit positions, included in said harness information, said harness position/configuration calculating unit being made to calculate said position of said harness and the configuration thereof according to said calculation mode selected by said mode selecting unit.

3. The harness design supporting apparatus according to claim 1, further comprising:

a verification unit for verifying interference between said component and said harness; and a transit position setting unit for, when a result of the verification by said verification unit shows that said component and said harness interfere with each other, setting said transit position so that said harness is positioned in parallel with a surface of said component at a position of the interference, said harness position/configuration calculating unit being made to calculate said position of said harness and said configuration thereof on the basis of said transit position set in said transit position setting unit and transit positions of said harness and information on a posture at each of said transit positions included in said harness information.

4. The harness design supporting apparatus according to claim 3, wherein, when a result of the verification by said verification unit shows that said component and said harness interfere with each other, said display control unit displays information indicative of a position of the interference on said display unit.

5. The harness design supporting apparatus according to claim 1, further comprising a verification unit for verifying interference between said component and said harness so that, when a result of the verification by said verification unit shows that said component and said harness interfere with each other, said display control unit displays information indicative of a position of the interference on said display unit.

6. The harness design supporting apparatus according to claim 1, further comprising a transit position changing unit made to change a transit position of said harness and posture information thereon so that said harness position/configuration calculating unit calculates said position of said harness and said configuration thereof on the basis of the harness transit position and the posture information changed in said transit position changing unit.

7. The harness design supporting apparatus according to claim 6, wherein said harness position/configuration calculating unit calculates said position of said harness and said configuration thereof by proportionally distributing a difference between the sum total of the shortest distances between transit positions on a passage route of said harness and the overall length of said harness among said transit positions on the basis of the harness transit position and the posture information changed by said transit position changing unit and the harness transit position and the posture information included in said harness information.

8. The harness design supporting apparatus according to claim 6, wherein said harness position/configuration calculating unit calculates said position of said harness and said configuration thereof immediately after the transit position of said harness and the posture information are changed by said transit position changing unit.

9. The harness design supporting apparatus according to claim 6, wherein, after transit positions of a plurality of harnesses and posture information are changed by said transit position changing unit, said harness position/configuration calculating unit calculates said position of said harness and said configuration thereof on the basis of the transit positions of said plurality of harnesses and the posture information after changed by said transit position changing unit.

10. The harness design supporting apparatus according to claim 6, wherein said harness position/configuration calculating unit calculates said position of said harness and said configuration thereof through the use of information on the position of said harness and the configuration thereof before the transit position of said harness and the posture information are changed by said transit position changing unit.

11. The harness design supporting apparatus according to claim 1, further comprising a curvature calculating unit for calculating a curvature of said harness on the basis of a result of the calculation of said position of said harness and said configuration thereof in said harness position/configuration calculating unit so that said display control unit displays information on the curvature of said harness on said display unit on the basis of the calculation result in said curvature calculating unit.

12. The harness design supporting apparatus according to claim 11, wherein said display control unit displays information indicative of a position of the maximum curvature of said harness on said display unit on the basis of the calculation result in said curvature calculating unit.

13. The harness design supporting apparatus according to claim 11, wherein, when the calculation result in said curvature calculating unit shows that a value of the curvature of said harness exceeds a predetermined value, said display control unit displays information indicative of this fact on said display unit.

14. A computer-readable recording medium recording a harness design supporting program for supporting an arrangement design of a harness in an apparatus incorporating said harness which is an object of design, said harness design supporting program making a computer function as:

a harness information setting unit for setting information on said harness as harness information;

a characteristic information setting unit for setting information on a physical characteristic of said harness as characteristic information;

a three-dimensional model constructing unit for constructing a three-dimensional model of each of said harness and a component on the basis of said harness information set in said harness information setting unit, three-dimensional model data on said component other than said harness in said design object apparatus, preserved in a component information preserving unit, and said characteristic information set in said characteristic information setting unit; and a display control unit for displaying said three-dimensional model, constructed in said three-dimensional model constructing unit, on a display unit, wherein, for making said computer function as said three-dimensional model constructing unit, said program makes said computer function as:

a harness position/configuration calculating unit for calculating a position of said harness and a configuration thereof on the basis of a position of said component, said harness information set in said harness information setting unit and said characteristic information set in said characteristic information setting unit; and a three-dimensional image producing unit for producing a three-dimensional image of each of said component and said harness on the basis of said position of said harness and said configuration thereof, calculated in said harness position/configuration calculating unit, said harness information set in said harness information setting unit and said three-dimensional model data on said component, and further for outputting said three-dimensional image, and said display control unit being made to display said three-dimensional image from said three-dimensional image producing unit on said display unit;

said harness position/configuration calculating unit calculates said position of said harness and the configuration through approximation using a Bezier curve on the basis of one or more transit positions of said harness and information on a posture at each of said transit positions, included in said harness information, and said characteristic information set in said characteristic information setting unit.

15. The computer-readable recording medium recording a harness design supporting program according to claim 14, wherein said program makes said computer function as a mode selecting unit for selecting one of a first calculation mode of calculating said position of said harness and said configuration thereof through approximation using a Bezier curve on the basis of one or more transit positions of said harness and information on a posture at each of said transit positions, included in said harness information, and said characteristic information set in said characteristic information setting unit and a second calculation mode of calculating said position of said harness and said configuration thereof through approximation using a Bezier curve on the basis of one or more transit positions of said harness and information on a posture at each of said transit positions, included in said harness information, said harness position/configuration calculating unit being made to calculate said position of said harness and the configuration thereof according to said calculation mode selected by said mode selecting unit.

16. The computer-readable recording medium recording a harness design supporting program according to claim 14, wherein said program makes said computer function as a verification unit for verifying interference between said component and said harness; and a transit position setting unit for, when a result of the verification by said verification unit shows that said component and said harness interfere with each other, setting said transit position so that said harness is positioned in parallel with a surface of said component at a position of the interference, said harness position/configuration calculating unit being made to calculate said position of said harness and said configuration thereof on the basis of said transit position set in said transit position setting unit and transit positions of said harness and information on a posture at each of said transit positions included in said harness information.

17. The computer-readable recording medium recording a harness design supporting program according to claim 14, wherein said program makes said computer function as a verification unit for verifying interference between said component and said harness so that, when a result of the verification by said verification unit shows that said component and said harness interfere with each other, said display control unit displays information indicative of a position of the interference on said display unit.

18. The computer-readable recording medium recording a harness design supporting program according to claim 16, wherein said program makes said computer carry out a function so that, when a result of the verification by said verification unit shows that said component and said harness interfere with each other, said display control unit displays information indicative of a position of the interference on said display unit.

19. The computer-readable recording medium recording a harness design supporting program according to claim 14, wherein said program makes said computer function as a transit position changing unit made to change a transit position of said harness and posture information thereon so that said harness position/configuration calculating unit calculates said position of said harness and said configuration thereof on the basis of the harness transit position and the posture information changed in said transit position changing unit.

20. The computer-readable recording medium recording a harness design supporting program according to claim 19, wherein said program makes said computer carry out a function so that said harness position/configuration calculating unit calculates said position of said harness and said configuration thereof by proportionally distributing a difference between the sum total of the shortest distances between transit positions on a passage route of said harness and the overall length of said harness among said transit positions on the basis of the harness transit position and the posture information changed by said transit position changing unit and the harness transit position and the posture information included in said harness information.

21. The computer-readable recording medium recording a harness design supporting program according to claim 19, wherein said program makes said computer carry out a function so that said harness position/configuration calculating unit calculates said position of said harness and said configuration thereof immediately after the transit position of said harness and the posture information are changed by said transit position changing unit.

22. The computer-readable recording medium recording a harness design supporting program according to claim 19, wherein said program makes said computer carry out a function so that, after transit positions of a plurality of harnesses and posture information are changed by said transit position changing unit, said harness position/configuration calculating unit calculates said position of said harness and said configuration thereof on the basis of the transit positions of said plurality of harnesses and the posture information after changed by said transit position changing unit.

23. The computer-readable recording medium recording a harness design supporting program according to claim 19, wherein said program makes said computer carry out a function so that said harness position/configuration calculating unit calculates said position of said harness and said configuration thereof through the use of information on the position of said harness and the configuration thereof before the transit position of said harness and the posture information are changed by said transit position changing unit.

24. The computer-readable recording medium recording a harness design supporting program according to claim 14, wherein said program makes said computer function as a curvature calculating unit for calculating a curvature of said harness on the basis of a result of the calculation of said position of said harness and said configuration thereof in said harness position/configuration calculating unit so that said display control unit displays information on the curvature of said harness on said display unit on the basis of the calculation result in said curvature calculating unit.

25. The computer-readable recording medium recording a harness design supporting program according to claim 24, wherein said program makes said computer carry out a function so that said display control unit displays information indicative of a position of the maximum curvature of said harness on said display unit on the basis of the calculation result in said curvature calculating unit.

26. The computer-readable recording medium recording a harness design supporting program according to claim 24, wherein said program makes said computer carry out a function so that, when the calculation result in said curvature calculating unit shows that a value of the curvature of said harness exceeds a predetermined value, said display control unit displays information indicative of this fact on said display unit.

* * * * *